(12) United States Patent
Babin

(10) Patent No.: US 7,131,833 B2
(45) Date of Patent: Nov. 7, 2006

(54) NOZZLE WITH THERMALLY CONDUCTIVE DEVICE

(75) Inventor: Denis Babin, Georgetown (CA)

(73) Assignee: Mold-Masters Ltd., Georgetown (CA)

( * ) Notice: Subject to any disclaimer, the term of this patent is extended or adjusted under 35 U.S.C. 154(b) by 236 days.

(21) Appl. No.: 10/713,211

(22) Filed: Nov. 17, 2003

(65) Prior Publication Data

US 2004/0101589 A1    May 27, 2004

Related U.S. Application Data

(60) Provisional application No. 60/427,958, filed on Nov. 21, 2002.

(51) Int. Cl.
    *B29C 45/20*      (2006.01)
(52) U.S. Cl. .................................................. 425/549
(58) Field of Classification Search ................. 425/549
    See application file for complete search history.

(56) References Cited

U.S. PATENT DOCUMENTS

| | | | |
|---|---|---|---|
| 4,312,630 A | 1/1982 | Travaglini |
| 4,389,002 A | 6/1983 | Devellian et al. |
| 4,793,795 A | 12/1988 | Schmidt et al. |
| 4,810,184 A | 3/1989 | Gellert et al. |
| 4,882,469 A | 11/1989 | Trakas |
| 4,899,435 A | 2/1990 | Trakas |
| 4,906,360 A | 3/1990 | Trakas |
| 4,921,708 A | 5/1990 | Gellert |
| 4,923,387 A | 5/1990 | Gellert |
| 4,988,848 A | 1/1991 | Trakas |
| 5,052,100 A | 10/1991 | Trakas |
| 5,055,028 A | 10/1991 | Trakas |
| 5,098,280 A | 3/1992 | Trakas |
| 5,136,141 A | 8/1992 | Trakas |
| 5,147,663 A | 9/1992 | Trakas |
| 5,180,594 A | 1/1993 | Trakas |
| 5,268,184 A | 12/1993 | Gellert |
| 5,316,468 A | 5/1994 | Gunther |
| 5,352,109 A | 10/1994 | Benenati |
| 5,474,439 A | 12/1995 | McGrevy |
| 5,641,526 A | 6/1997 | Gellert |
| 5,871,786 A | 2/1999 | Hume et al. |

(Continued)

FOREIGN PATENT DOCUMENTS

DE     19723374     12/1997

(Continued)

OTHER PUBLICATIONS

AerMet 310 Alloy data sheet, pp. 1-3, cartech.ides.com/datasheet,Feb. 23, 2006.*

(Continued)

*Primary Examiner*—Tim Heitbrink
(74) *Attorney, Agent, or Firm*—Medler Ferro PLLC

(57) ABSTRACT

A nozzle (e.g., a flat nozzle, an asymmetric nozzle, a micro nozzle, a flat micro nozzle, etc.) is configured to make injection molded components. The nozzle includes a nozzle body, a heater associated with the nozzle body, a melt channel running through the nozzle body configured to allow melt material flow, and a thermally conductive device located inside the nozzle body. The thermally conductive device can be configured to produce an even heat profile along an entire length of the melt channel. The nozzle body can be symmetrical or asymmetrical and can be made of a different, less thermally conductive material, than the thermally conductive device. The thermally conductive device can be used to balance a heating profile of the nozzle to produce consistency in melt material viscosity and speed throughout a micro nozzle channel.

34 Claims, 21 Drawing Sheets

U.S. PATENT DOCUMENTS

| | | | |
|---|---|---|---|
| 5,955,121 A | 9/1999 | Gellert et al. | |
| 6,619,948 B1 | 9/2003 | Gunther | |
| 6,805,549 B1 | 10/2004 | Gunther | |
| 2003/0124216 A1* | 7/2003 | Guenther et al. | 425/549 |

FOREIGN PATENT DOCUMENTS

| | | |
|---|---|---|
| WO | WO00/46008 | 8/2000 |
| WO | WO01/96090 | 12/2001 |

OTHER PUBLICATIONS

AerMet 100 Alloy data sheet, pp. 1-11, cartech.ides.com/datasheet, Feb. 23, 2006.*

\* cited by examiner

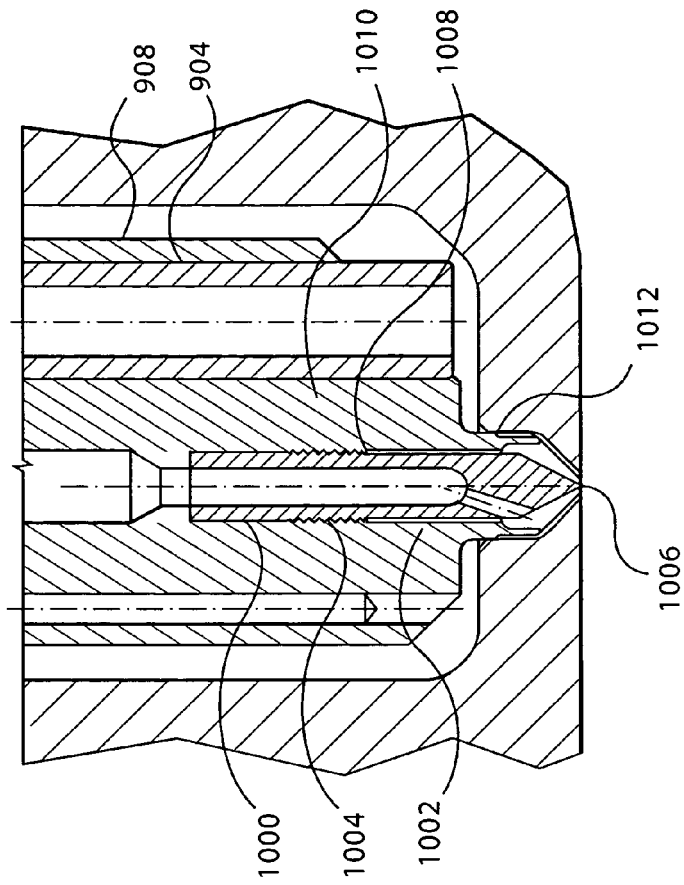
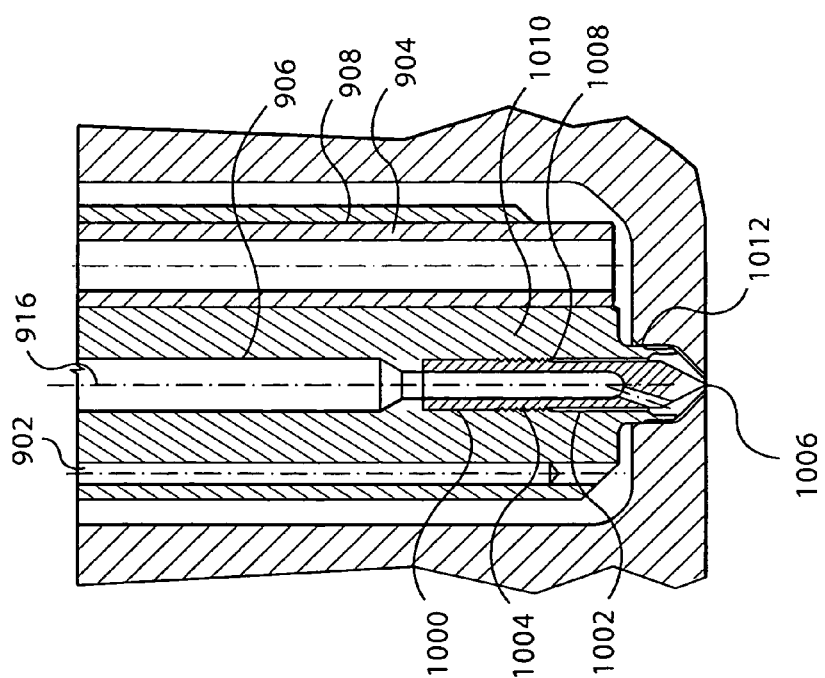
FIG. 10C
FIG. 10B

NOZZLE WITH THERMALLY CONDUCTIVE DEVICE

CROSS-REFERENCE TO RELATED APPLICATIONS

This application claims benefit under 35 U.S.C. §119(e) to U.S. Provisional Patent Application No. 60/427,958, filed Nov. 21, 2002, to Babin, which is incorporated by reference herein in its entirety.

BACKGROUND OF THE INVENTION

1. Field of the Invention

The present invention is related to an injection molding device, system, and method. Specifically, an injection molding device, system, and method using asymmetrical nozzles, flat nozzles, or flat micro nozzles. The present invention is further related to arrays of asymmetrical nozzles, flat nozzles, or arrays of flat micro nozzles that are tightly spaced along a preferred direction.

2. Background

In the production of small injection molded objects and of objects having a small dimension along a certain direction, it is ideal to use an array of tight or small pitch injection systems in order to increase the output per injection cycle without increasing the overall foot print of the entire system. (e.g., systems that have a small or tight spacing between adjacent nozzles or adjacent injection molding parts). One problem that arises is that, while the injection molding devices (e.g., nozzles) have become increasingly smaller (e.g., micro nozzles), it has become more difficult to provide a uniform temperature profile in various areas of the nozzles. Typically, injection nozzles have a heater element, such as a tubular, thin film, band heater, embedded heater or helical coil heater that are wrapped around the nozzle body. There are also injection nozzles including cartridge heaters and heat pipe heaters located inside the nozzle body along the melt channel. Spacing available within the nozzle for the heater element decreases as pitch specifications require smaller or thinner pitches.

Every molding process has a required tolerance for a temperature window and a temperature profile along the melt channel of the injection nozzle to manufacture an injection molded object. Depending on a melt material being used in the process, this tolerance can become relatively narrow. For example, if there is 50–60 degrees of temperature variation in different areas of a nozzle along the melt channel, there can be areas where the melt material will prematurely solidify. This can cause mild to severe blockage of a nozzle channel, which can completely stop melt material flow in the nozzle channel.

This problem is exacerbated in the flat micro nozzles that are being designed with increasingly smaller diameter nozzle channels and that have quasi square cross sectional profiles.

Reference is made in this regard to DE 19723374 to Heitec that shows a flat nozzle having a heater located in the nozzle body along the melt channel. The heater wiring disclosed therein has an uneven distribution along the melt channel in order to compensate for the inherent heat loss that occurs at the head portion and at the tip portion of the nozzle.

Another manufacturer, Günther Heisskanaltechnik (see US Patent 2002/0102322A1), uses a flat copper jacket that uses a cartridge heater, which is mounted around the nozzle body and along the melt channel. This heating configuration attempts to address the problem of uneven heating. Unfortunately, in order to fit the copper jacket, a size of the nozzle must be increased. Hence, this method most likely will not work with micro nozzles that are arrayed to fit a certain space constraint.

Therefore, what is desired is a nozzle (e.g., a flat nozzle, a micro nozzle, or a flat micro nozzle, all referred to herein as "micro nozzle") that balances a heating profile of the flat micro nozzle to produce consistency in melt material viscosity and speed throughout a micro nozzle channel without adding significantly to the size of the nozzle.

SUMMARY OF THE INVENTION

Embodiments of the present invention provide a nozzle (e.g., a flat nozzle, an asymmetric nozzle, a micro nozzle, or a flat micro nozzle, all referred to herein as "micro nozzle") including a heating device, a melt channel, and a thermally conductive device proximate to or coupled with the heating device and/or an optional thermocouple(s).

Embodiments of the present invention provide a nozzle (e.g., a flat nozzle, an asymmetric nozzle, a micro nozzle, a flat micro nozzle, etc.) configured to make injection molded components. The nozzle includes a nozzle body, a heater associated with the nozzle body, a melt channel running through the nozzle body configured to allow melt material flow, and a thermally conductive device located inside the nozzle body. The thermally conductive device can be configured to produce an even heat profile along an entire length of the melt channel. The nozzle body can be symmetrical or asymmetrical and can be made of a different, less thermally conductive material, than the thermally conductive device.

In one aspect, the thermally conductive device can be used to balance a heating profile of the nozzle to produce consistency in melt material viscosity and speed throughout a micro nozzle channel.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 10B and 10C are close-up views of a section of the micro nozzle in FIGS. 9 and 10A.

Figure 2:
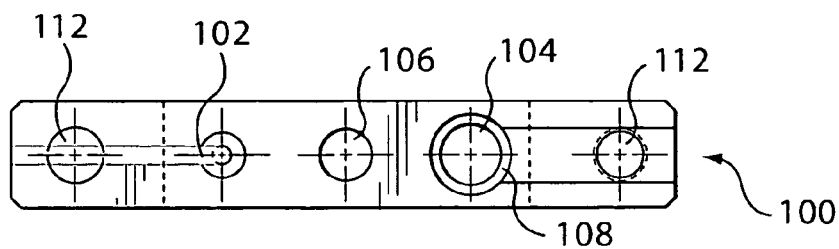
FIGS. 1–2 are a cross-sectional and an end view, respectively, of a nozzle according to an embodiment of the present invention.

The present invention will now be described with reference to the accompanying drawings. In the drawings, most like reference numbers may indicate identical or functionally similar elements. Additionally, the left-most digit(s) of a reference number may identify the drawing in which the reference number first appears.

DETAILED DESCRIPTION OF THE EMBODIMENTS

Overview

Embodiments of the present invention provide various nozzle configurations (e.g., micro nozzle configurations) that can include a thermally conductive material (e.g., copper, or the like) proximate or coupled to a heat device(s) and/or optional thermocouple(s). The thermally conductive material is used to balance a heat profile of a micro nozzle. Having an even heat profile allows for consistency in viscosity and speed of melt material flowing through a micro nozzle channel. A configuration of the thermally conductive material within the micro nozzle can be designed to allow for a reduction in the micro nozzle channel size and an overall micro nozzle size, taking into account pressure requirements.

Examples of general injection molding systems that use flat nozzles include U.S. Pat. Nos. 4,793,795, 4,810,184, and 4,923,387. All these patents are assigned to Mold-Masters Limited, and are incorporated herein in their entireties by reference thereto.

Micro nozzles are used to produce smaller and smaller injected molded objects. Also, micro nozzles allow for a greater number of nozzles in a system with limited space. For example, in a molding machine using conventional nozzles, generally 16 nozzles are possible in a drop area. In contrast, micro nozzles manufactured according to the present invention are sized to allow for 32 to 64 micro nozzles to be used in the same size drop area.

The various micro nozzles described below can be manufactured from tool steel, AERMET 100 alloy, or AERMET 310 alloy, the AERMET alloys being alloys of carbon, nickel, cobalt, chromium, molybedenum and iron that are manufactured by Carpenter Technology Corporation, or other known metals or alloys. A ratio between a diameter of an entire nozzle and a nozzle channel is sufficient to withstand injection pressures. Through use of a thermally conductive device in the configurations taught, a micro nozzle's size will not become larger, and may become smaller, while still achieving the desired even heat profile.

Figure 1:
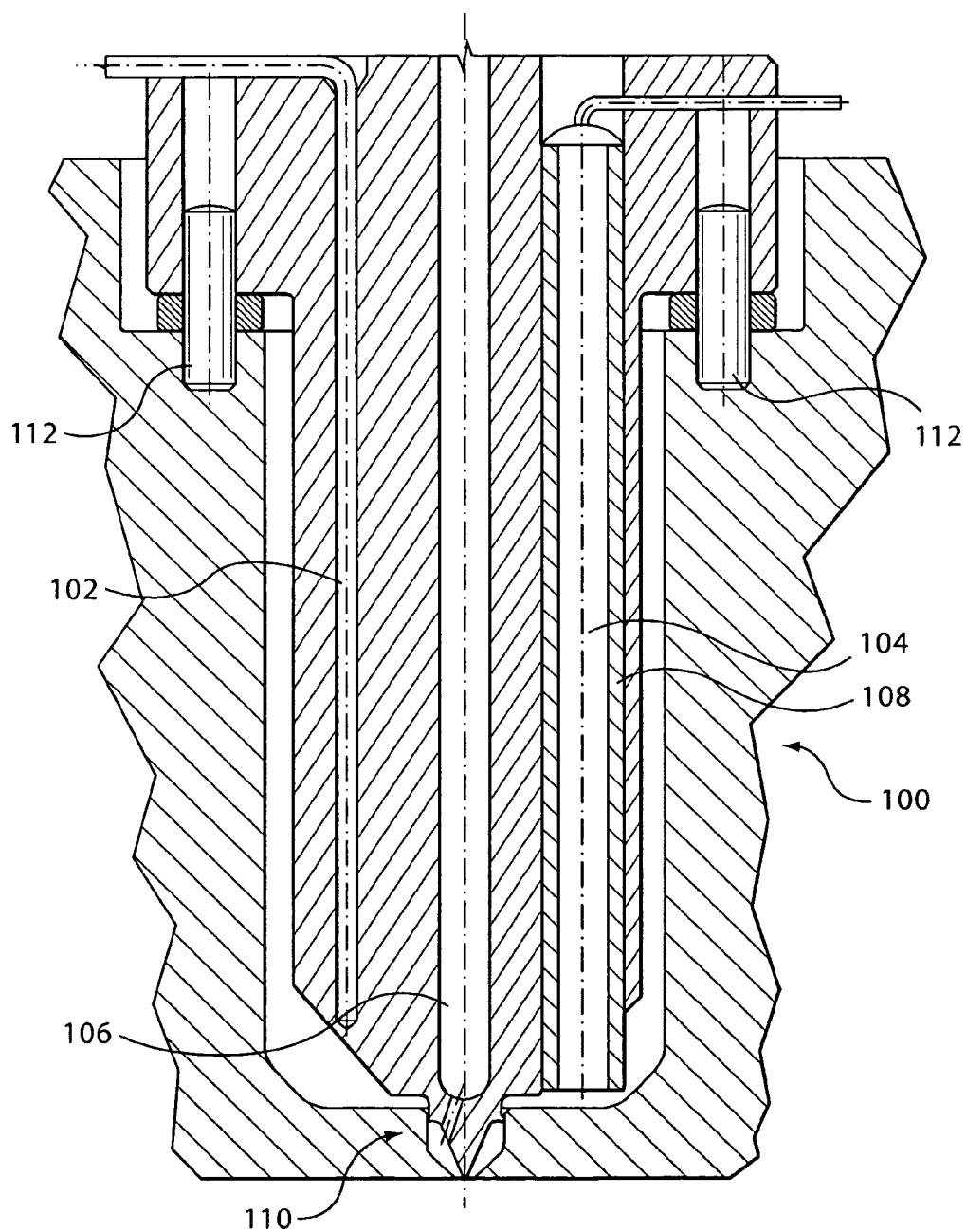

After initially describing the elements in a micro nozzle 100 shown in FIGS. 1–2, the other figures are substantially labeled with similar numbers for similar parts. However, only variations between embodiments may be described in detail. It is to be appreciated that all variations and permutations of using a thermally conductive material proximate to or coupled with a heating device(s) and/or an optional thermocouple(s) in order to balance a heat profile within a nozzle are contemplated within the scope of the present invention. It is also to be appreciated that, although not specifically shown, systems employing conventional manifolds and mold cavities can use the nozzles described, and are contemplated within the scope of the invention.

Thermal-Gated Nozzles

Thermal-gated nozzles typically operate at a set temperature, where a gate is opened and closed based on injection force. When the injection of melt material is stopped, a portion of the melt material in the gate area may harden slightly to allow a part to be ejected from the mold cavity. The partially solidified material stops melt material from flowing out of the nozzle, i.e., holds any plastic in the nozzle. Then, when the injection of the melt material begins again, the injection force pushes any cold material into the mold. An example of a molding system that uses thermal gating includes U.S. Pat. No. 5,955,121, which is incorporated herein in its entirety by reference thereto.

FIGS. 1–2 are a cross-sectional and an end view, respectively, of a nozzle (e.g., a nozzle, a flat nozzle, a micro nozzle, or a flat micro nozzle, all hereinafter referred to as "micro nozzles") 100 according to an embodiment of the present invention. In some embodiments, micro nozzle 100 can be a micro-nozzle in an array of micro-nozzles (e.g., see FIG. 32).

Micro nozzle 100 includes an optional thermocouple 102 that controls a heater 104 (e.g., a cartridge heater, which is shaped like a rod). For example, a control device (not shown) can be configured to receive a signal from the thermocouple 102. Heater 104 can then be configured to be controlled via the control device based on the received signal from the thermocouple 102. The thermocouple 102 and heater 104 are positioned on opposite sides of a nozzle or melt channel 106. Proximate or coupled to heater 102 is a thermally conductive device 108. Thermally conductive device 108 can be made from copper, brass, beryllium, aluminum, or any material that provides a high thermal conductivity. This material can be different than the material making up a body of nozzle 100 and can be more thermally conductive than the body material. Also, thermally conductive device 108 can be in various shapes, such as a sleeve, a cylinder, a tube, or the like. Micro nozzle 100 also includes a tip area 110, where melt material exits nozzle 100, and a flange area that includes dowels 112, which can be used for alignment of nozzle 100 with respect to a manifold (not shown) and/or a mold cavity (not shown).

Conventionally, during molding operations the use of different plastics and/or pressures produces different cooling and heating characteristics for a nozzle. This can result in different heat loss characteristics in different areas of the nozzle. For example, it is typical for different areas to lose 100 BTUs to 1000 BTUs during a molding operation. However, through the use of thermally conductive device 108, an even heat profile can be produced by balancing out relatively hotter or colder areas of the nozzle.

Thus, although heating element 104 generates a constant heat, temperatures and pressures vary in micro nozzle 100 because there are different heat loses in tip 110 and a flange area. Through use of thermally conductive device 108, hot spots can be quickly cooled and cool spots can be quickly heated by drawing heat to or from those areas, respectively. Thus, thermally conductive device 108 draws heat from overheating spots to bring them back to colder temperatures and draws heat into cold spots to warm them.

Through this process, an overall heat profile of micro nozzle 100 is evened out or stabilized. Hence, thermally conductive device 108 does not solely distribute heat directly from heater 104, but also redistributes heat from anywhere inside nozzle 100 to other areas of nozzle 100 that need balancing. In some embodiments, thermally conductive device 108 is positioned in a hottest area and/or close to a tip 110, especially in thermal-gating nozzles. It is to be appreciated that thermally conductive device 108 may be made in various forms, such as a rod, a vein, or material poured inside a cavity within micro nozzle 100. These features will be true of all subsequently discussed embodiments using a thermally conductive device.

Figure 4:
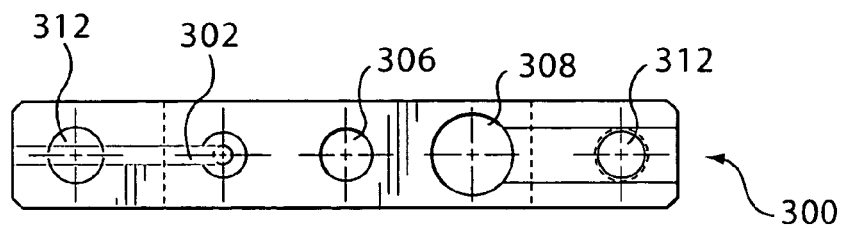
FIGS. 3–4 are a cross-sectional and an end view, respectively, of a micro nozzle according to an embodiment of the present invention.
Figure 3:
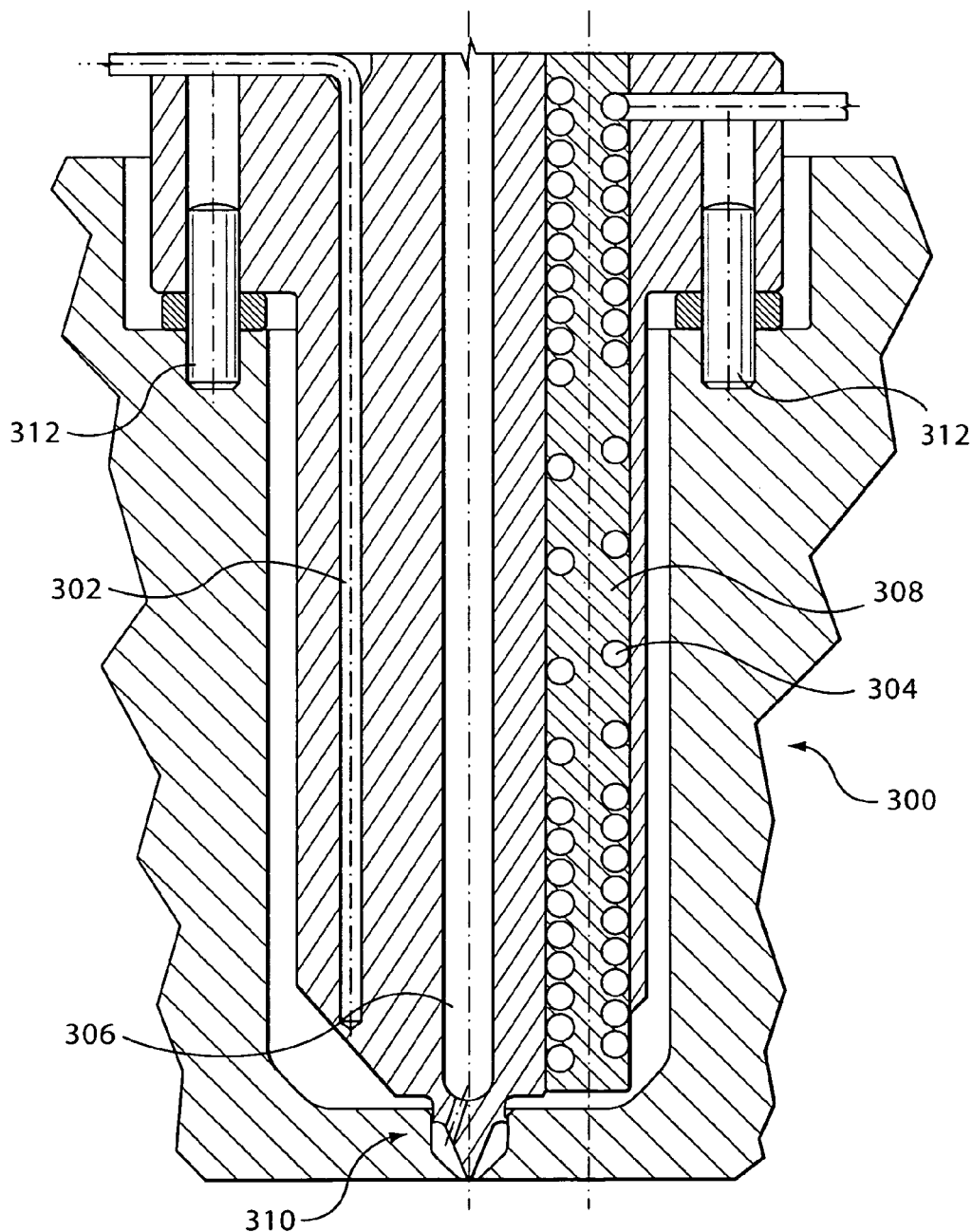

FIGS. 3–4 are a cross-sectional and an end view, respectively, of a micro nozzle 300 according to an embodiment of the present invention. One variation between micro nozzle 100 and micro nozzle 300 is that a heater 304 (e.g., a tubular heater) is used instead of cartridge heater 104. Heater 304 is wound into (e.g., possibly made integral with) a thermally conductive device 308 and positioned within micro nozzle 300.

Figure 6:
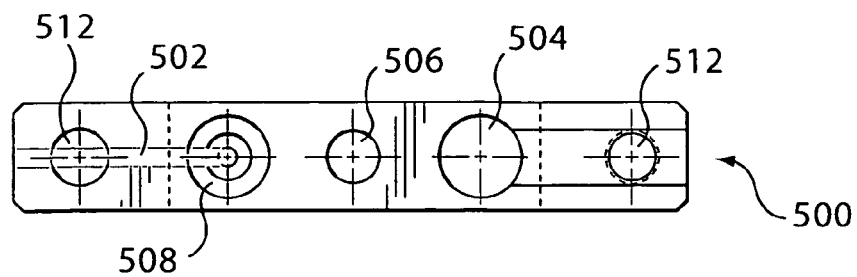
FIGS. 5–6 are a cross-sectional and an end view, respectively, of a micro nozzle according to an embodiment of the present invention.
Figure 5:
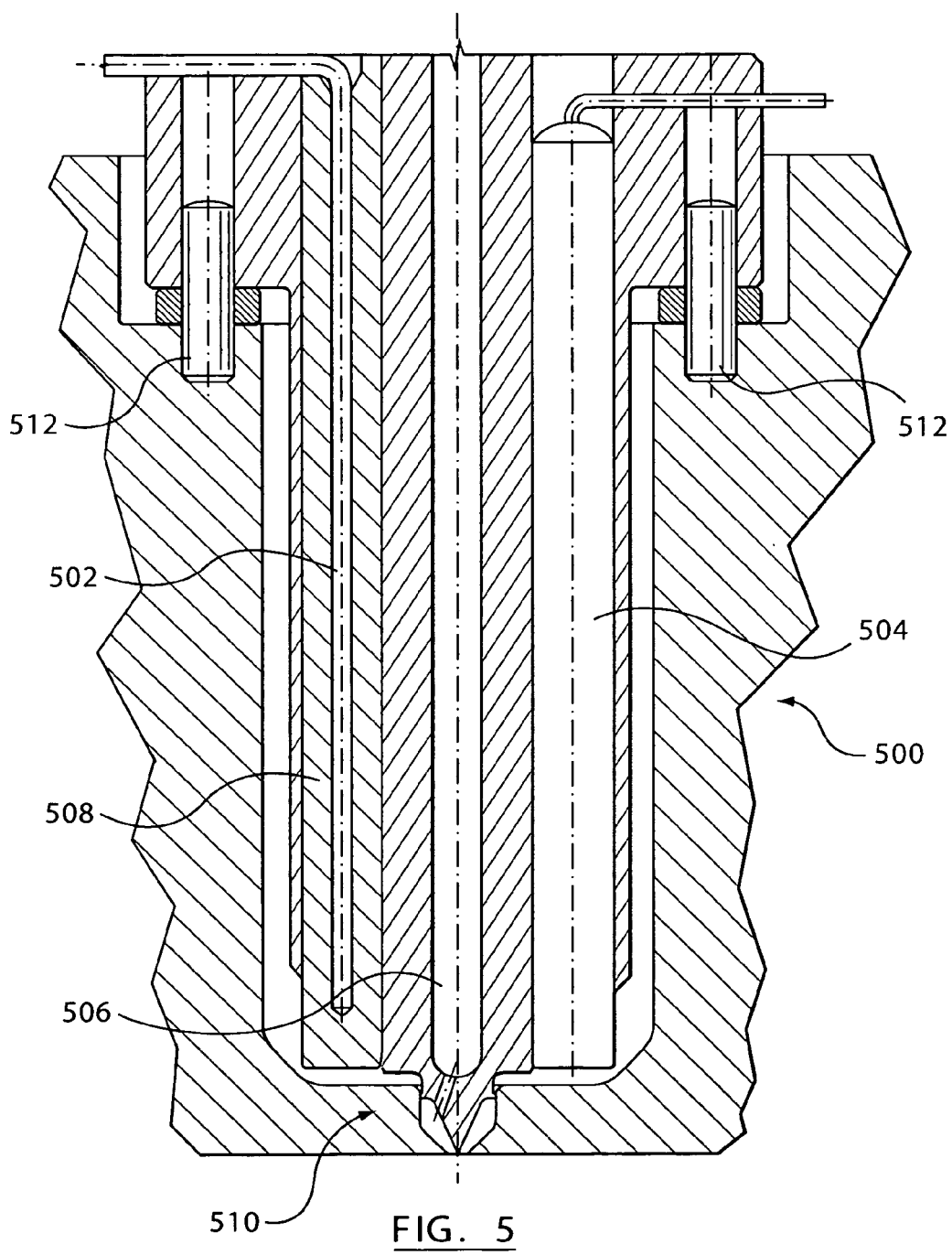

FIGS. 5–6 are a cross-sectional and an end view, respectively, of a micro nozzle 500 according to an embodiment of the present invention. In this embodiment, a cavity for heater 504 may be too small to allow for a thermally conductive device 508 to be positioned proximate to heater 504. Thus, thermally conductive sleeve 508 is placed proximate to (e.g. around, surrounding, etc.) thermocouple 502.

Figure 8:
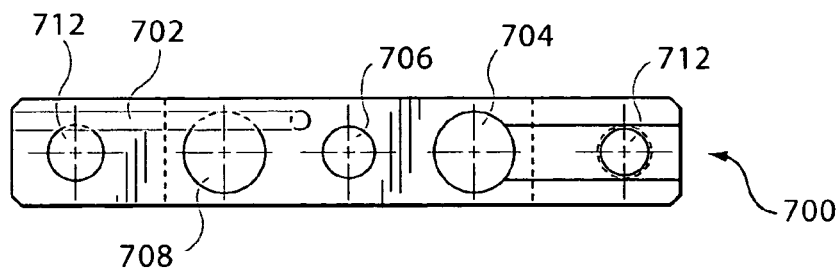
FIGS. 7–8 are a cross-sectional and an end view, respectively, of a micro nozzle according to an embodiment of the present invention.
Figure 7:
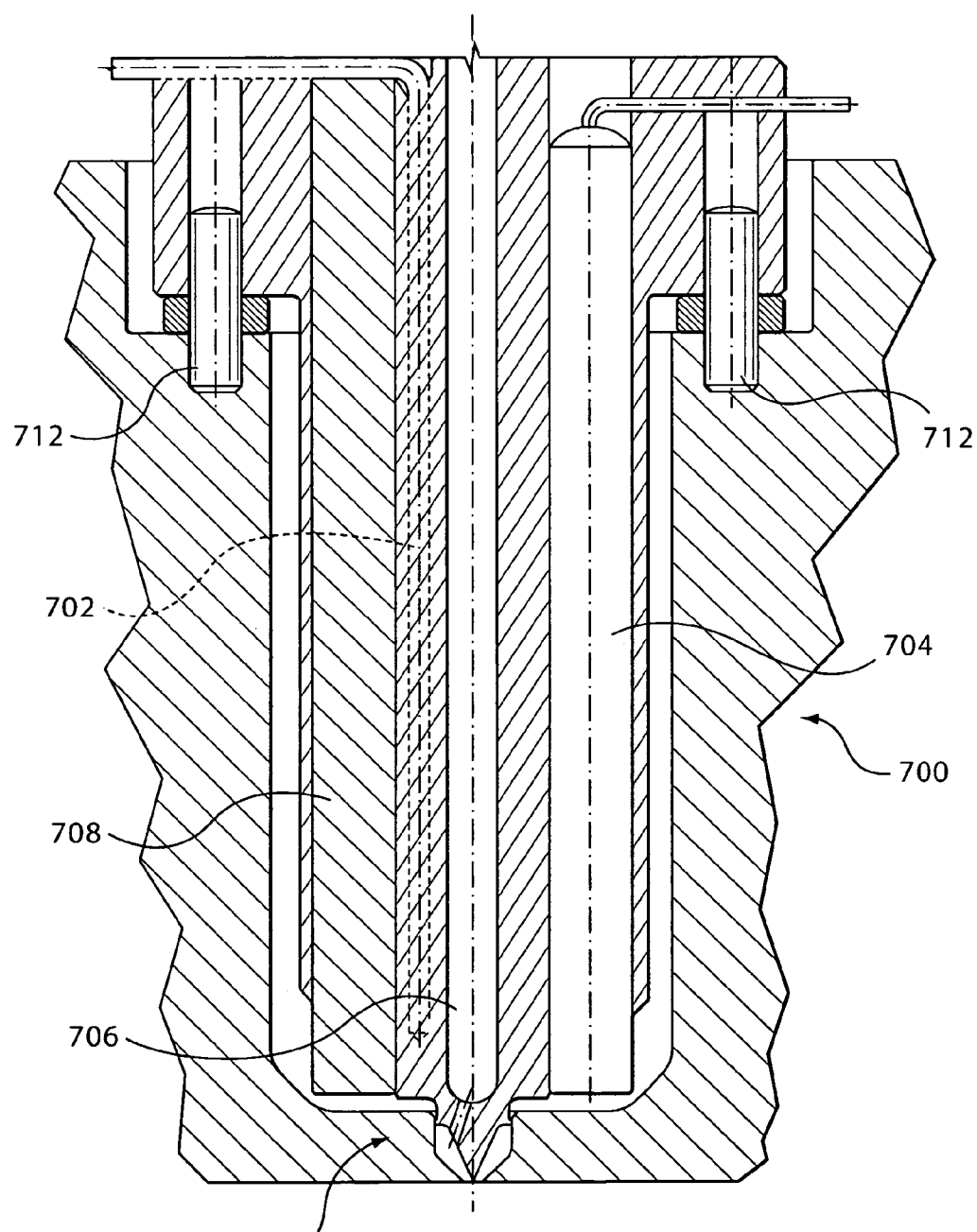

FIGS. 7–8 are a cross-sectional and an end view, respectively, of a micro nozzle 700 according to an embodiment of the present invention. This configuration is similar to the embodiment shown in FIGS. 5–6, except micro nozzle 700 includes a thermally conductive device 708 located adjacent to a thermocouple 702.

Figure 10A:
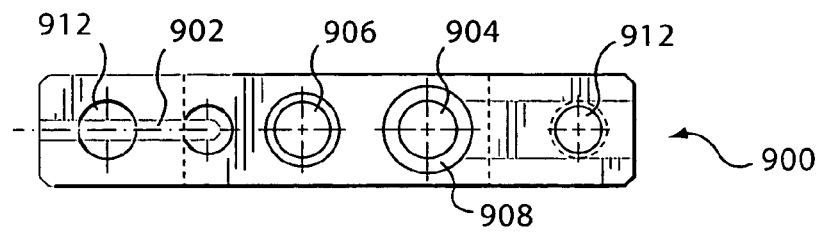
FIGS. 9 and 10A are a cross-sectional and an end view, respectively, of a micro nozzle according to an embodiment of the present invention.
Figure 9:
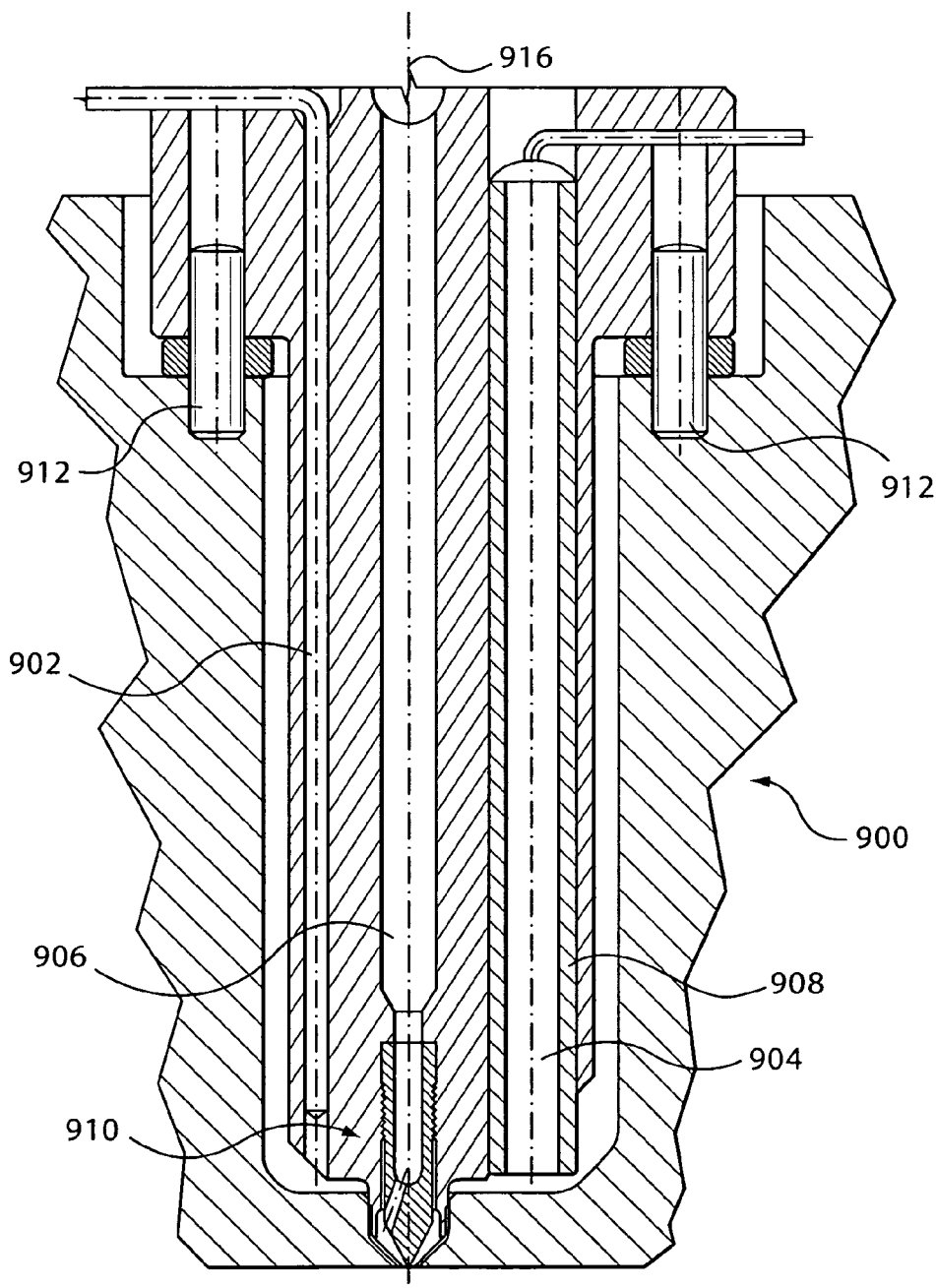

FIGS. 9 and 10A are a cross-sectional and an end view, respectively, of a micro nozzle 900 according to an embodiment of the present invention. In this embodiment, micro nozzle 900 (e.g., a nozzle body) is asymmetrical about a longitudinal axis 916 of the micro nozzle melt channel. Asymmetrical micro nozzles can be used in systems that require a reduction in micro nozzle size along one side. Also, a configuration for a nozzle tip area 910 is shown having a sealing diameter as part of a nozzle body located near an area that a melt material seals off in a mold plate.

FIGS. 10B and 10C are close-up views of micro nozzle 900. They show one possible placement of a thermally conductive device 908. Micro nozzle 900 also includes locating diameters 1000 and 1002 (e.g., locates the tip in the gate, and seals off so plastic cannot flow outside the system), thread 1004 (e.g., used to screw the tip to nozzle body), a gate 1006, a screwed in tip 1008, a nozzle body 1010, and a sealing diameter 1012 (e.g., seals nozzle from mold cavity) of nozzle body 1010.

Figure 11:
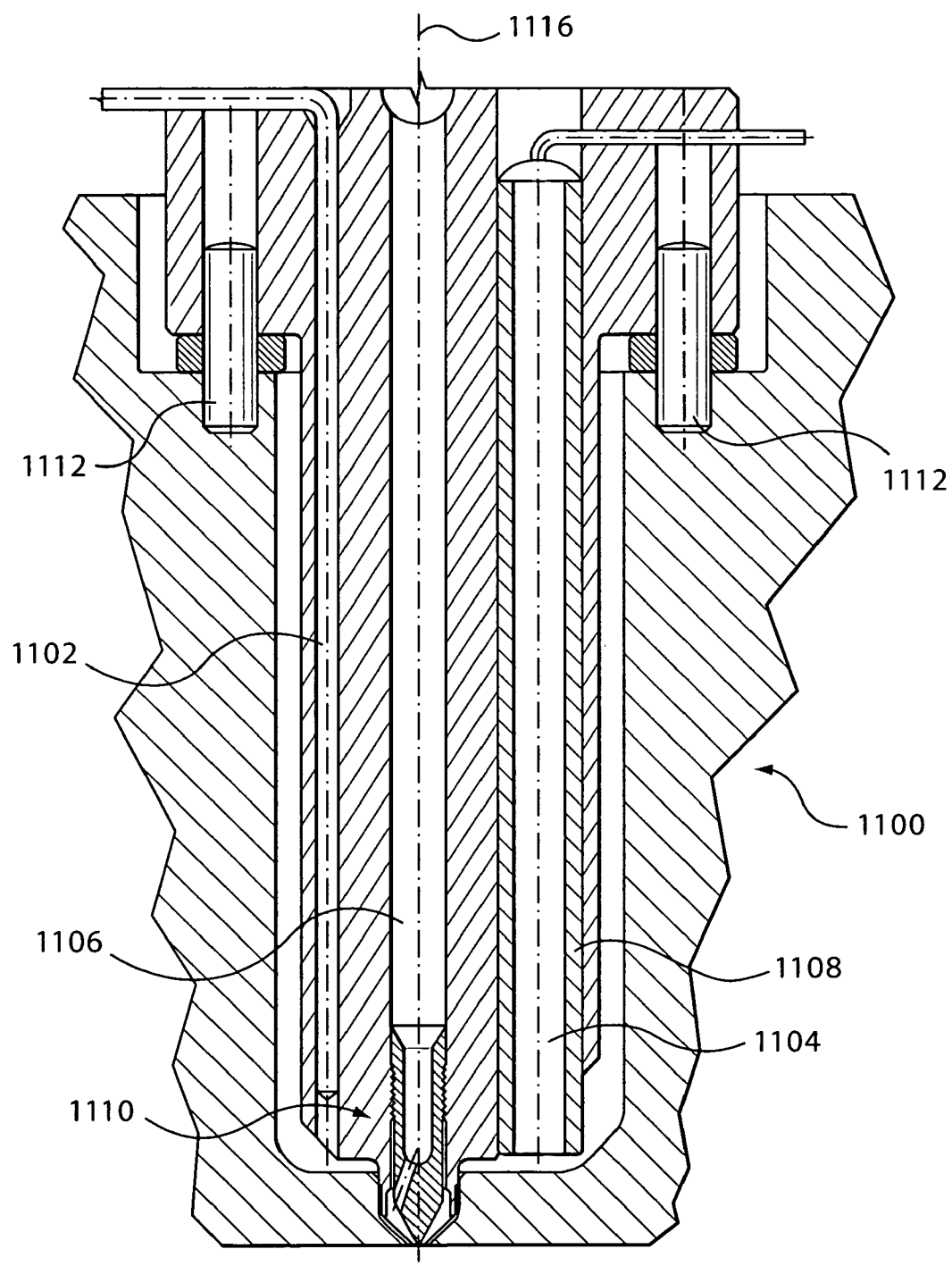
FIGS. 11 and 12A are a cross-sectional and an end view, respectively, of a micro nozzle according to an embodiment of the present invention.
Figure 12A:
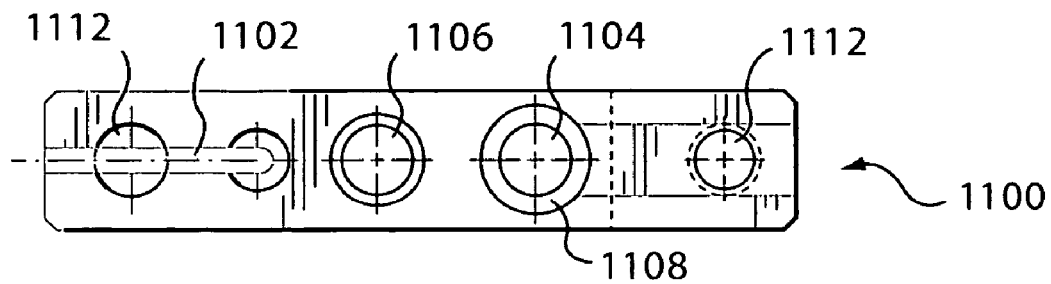
Figure 12B:
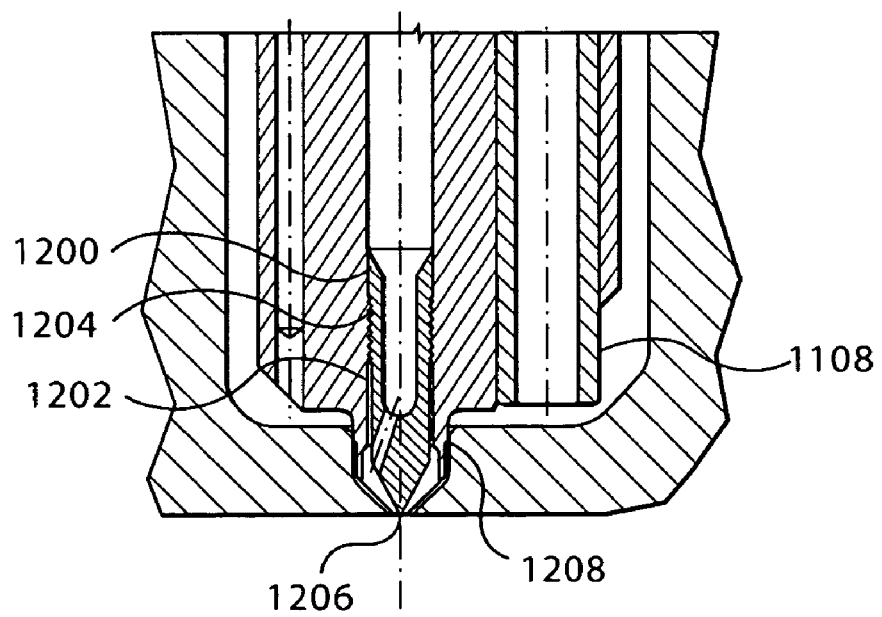
FIG. 12B is a close-up view of a section of the micro nozzle in FIGS. 11–12A.

FIGS. 11 and 12A are a cross-sectional and an end view, respectively, of a micro nozzle 1100 according to an embodiment of the present invention. Similar to micro nozzle 900, micro nozzle 1100 is asymmetrical about a longitudinal axis 1116 of the nozzle melt channel. FIG. 12B is a close-up view of micro nozzle 1100 that shows one possible placement of a thermally conductive device 1108. Micro nozzle 1100 also includes locating diameters 1200 and 1202, a thread 1204, a gate 1206, and a sealing diameter 1212.

Figure 13:
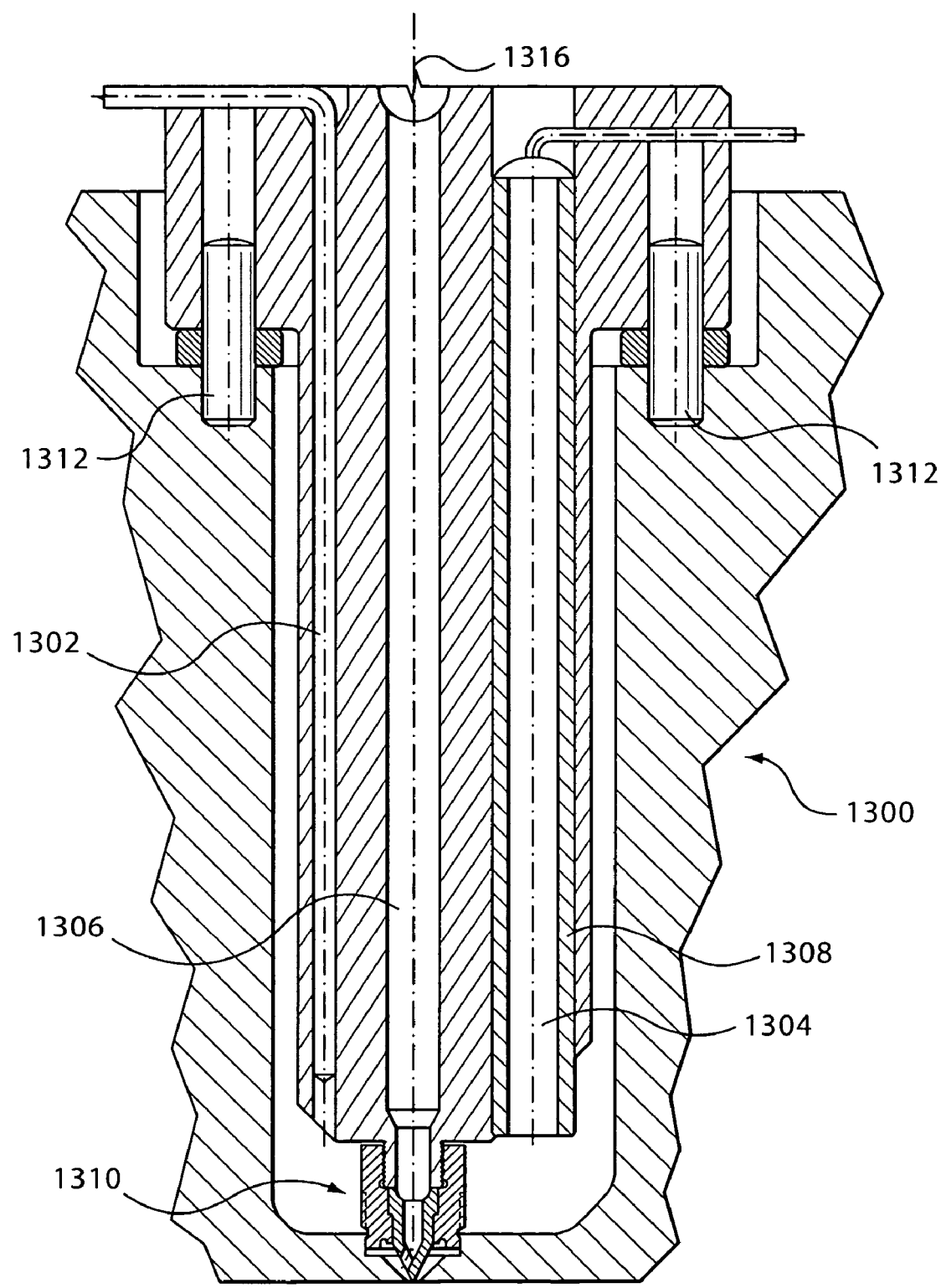
FIGS. 13 and 14A are a cross-sectional and an end view, respectively, of a micro nozzle according to an embodiment of the present invention.
Figure 14A:
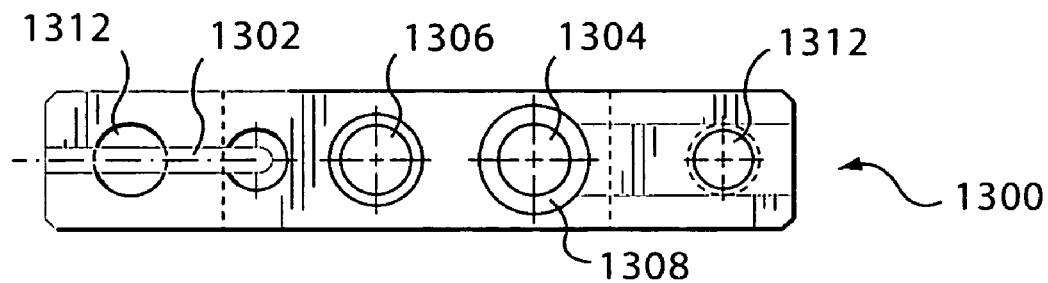
Figure 14B:
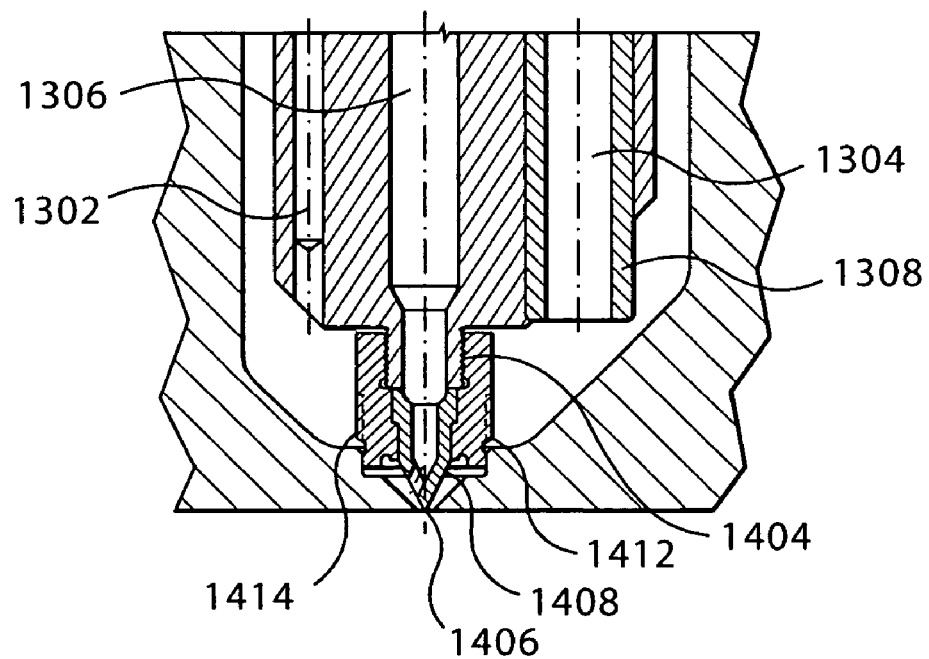
FIG. 14B is a close-up view of a section of the micro nozzle in FIGS. 13 and 14A.

FIGS. 13 and 14A are a cross-sectional and an end view, respectively, of a micro nozzle 1300 according to an embodiment of the present invention. In this embodiment, micro nozzle 1300 is asymmetrical about a longitudinal axis 1316 of the nozzle melt channel. FIG. 14B is a close-up view of micro nozzle 1300 that shows one possible placement of a thermally conductive device 1308. Micro nozzle 1300 also includes a thread 1404, a gate 1406, a tip 1408, a transfer seal 1412 (e.g., a gate seal, transition between nozzle body and gate insert), and a hexagonal surface 1414 for removal (e.g., a mechanical means for removing tip or transfer seal is provide a socket on the hex).

Figure 15:
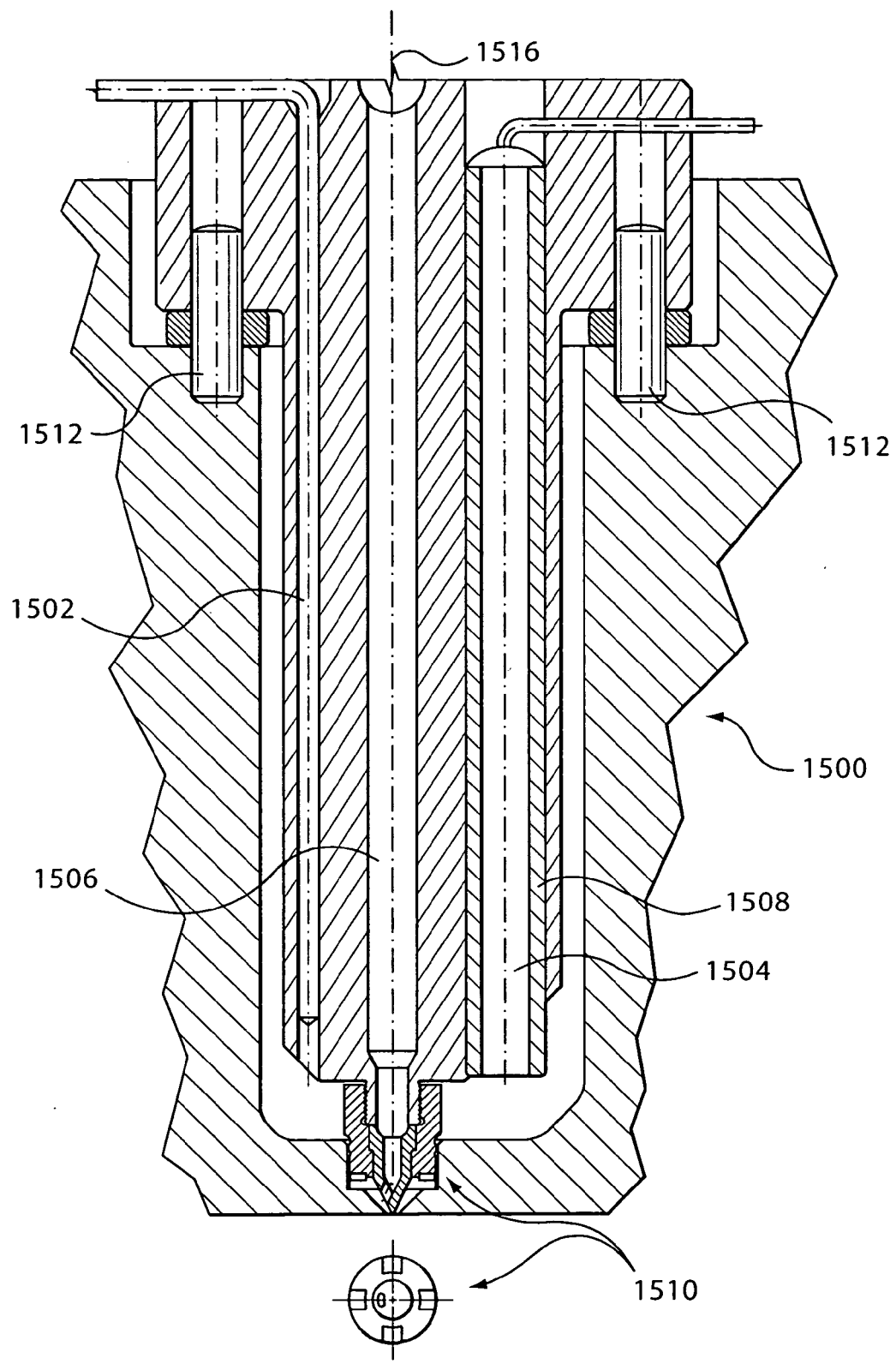
FIGS. 15 and 16A are a cross-sectional and an end view, respectively, of a micro nozzle according to an embodiment of the present invention.
Figure 16A:
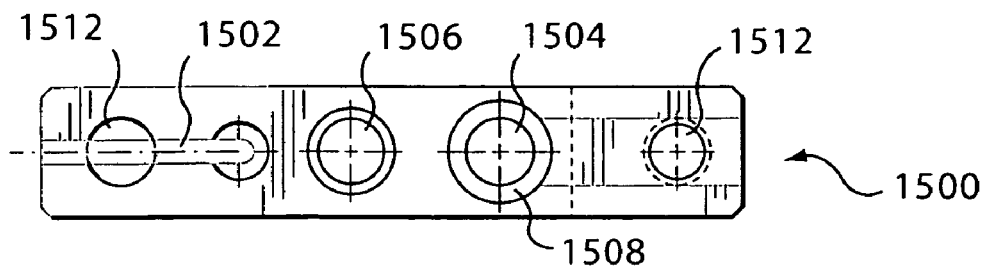
Figure 16B:
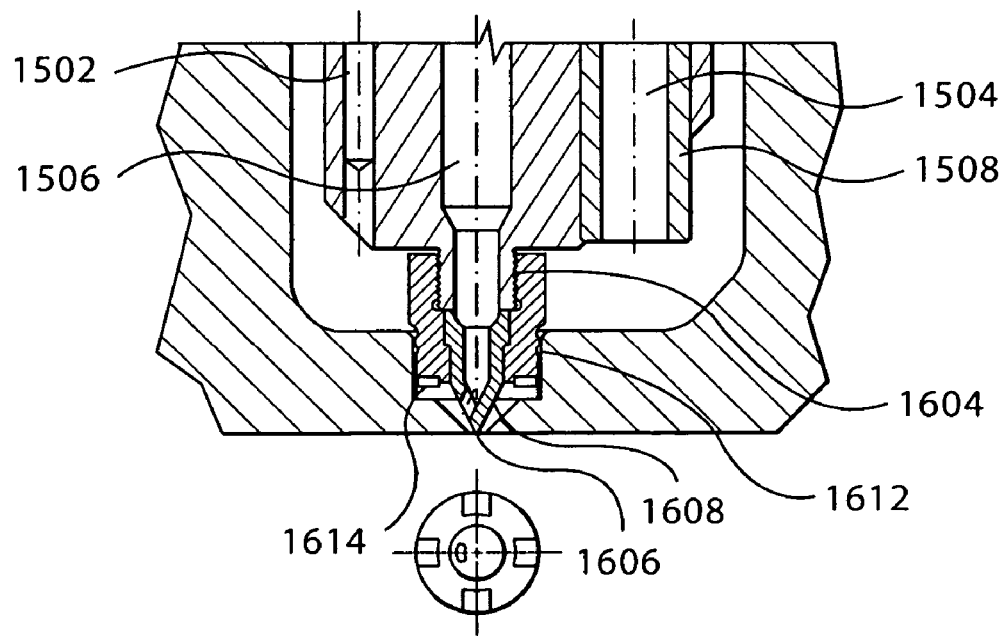
FIG. 16B is a close-up view of a section of the micro nozzle in FIGS. 15 and 16A.

FIGS. 15 and 16A are a cross-sectional and an end view, respectively, of a micro nozzle 1500 according to an embodiment of the present invention. In this embodiment, micro nozzle 1500 is asymmetrical about a longitudinal axis 1516 of the nozzle melt channel. FIG. 16B is a close-up view of micro nozzle 1500 that shows one possible placement of a thermally conductive device 1508. Micro nozzle 1500 also includes a thread 1604 on the nozzle body, a gate 1606, a tip 1608, a seal 1612, and prongs 1614 for removal (e.g., a mechanical means to allow removal of the tip, when have to put socket around of seal takes up real estate, cannot get as close as want, so use prong instead of hexagon to reduce size and allow small tool to remove seal or tips).

Figure 18:
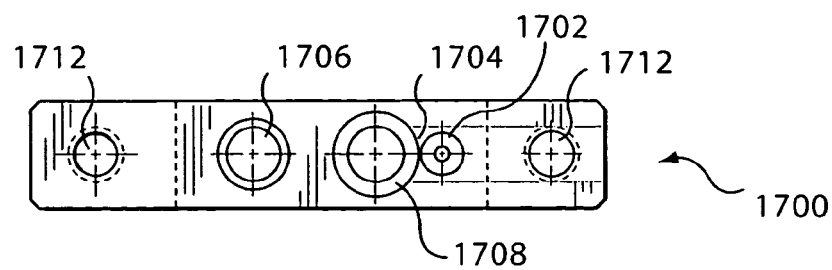
FIGS. 17–18 are a cross-sectional and an end view, respectively, of a micro nozzle according to an embodiment of the present invention.
Figure 17:
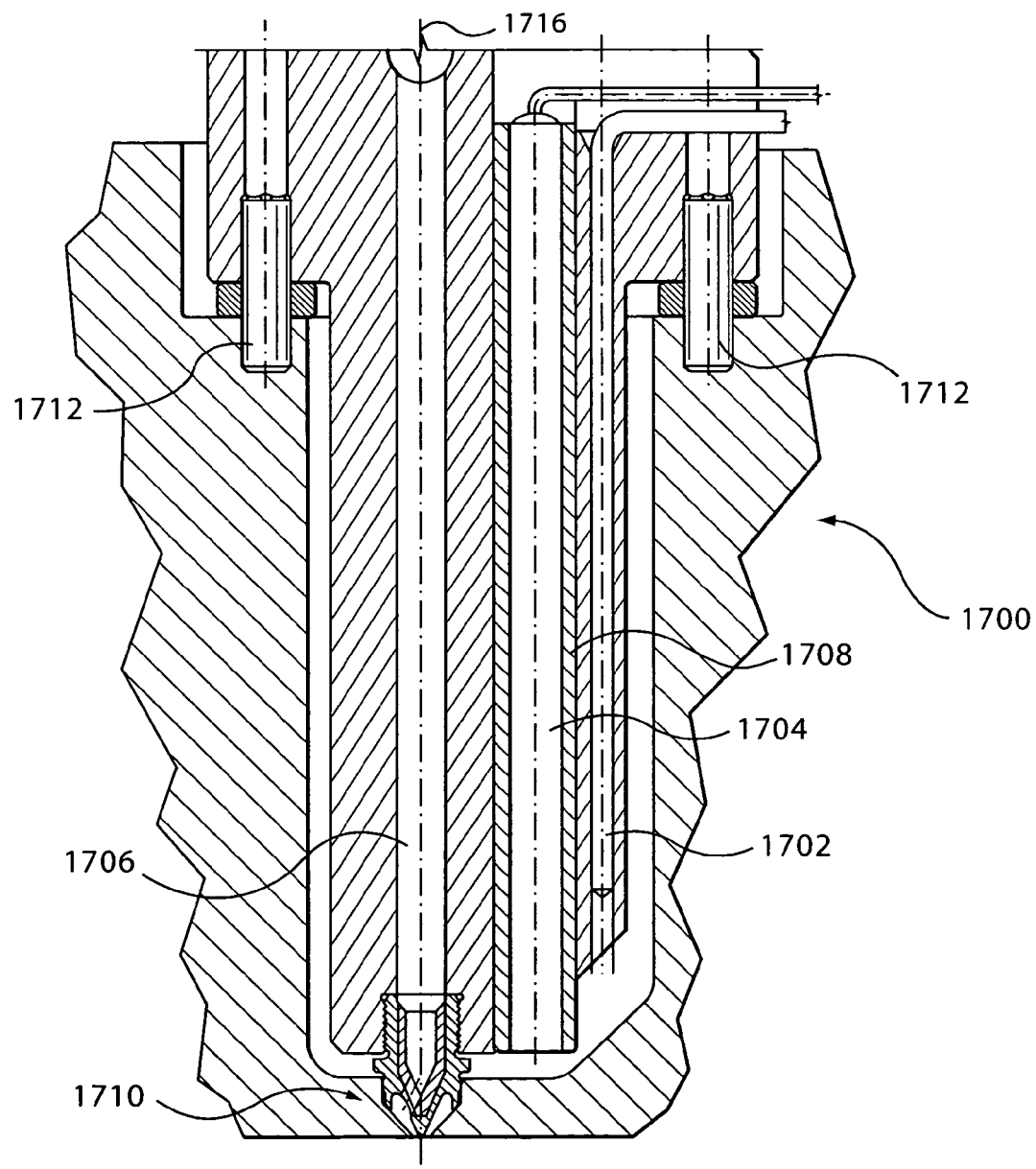

FIGS. 17–18 are a cross-sectional and an end view, respectively, of a micro nozzle 1700 according to an embodiment of the present invention. In this embodiment, micro nozzle 1700 is asymmetrical about a longitudinal axis 1716 of the nozzle melt channel.

Figure 20:
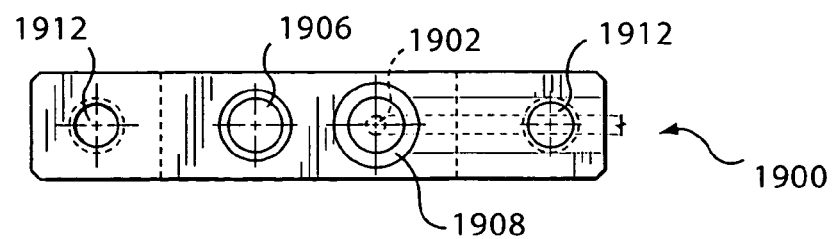
FIGS. 19–20 are a cross-sectional and an end view, respectively, of a micro nozzle according to an embodiment of the present invention.
Figure 19:
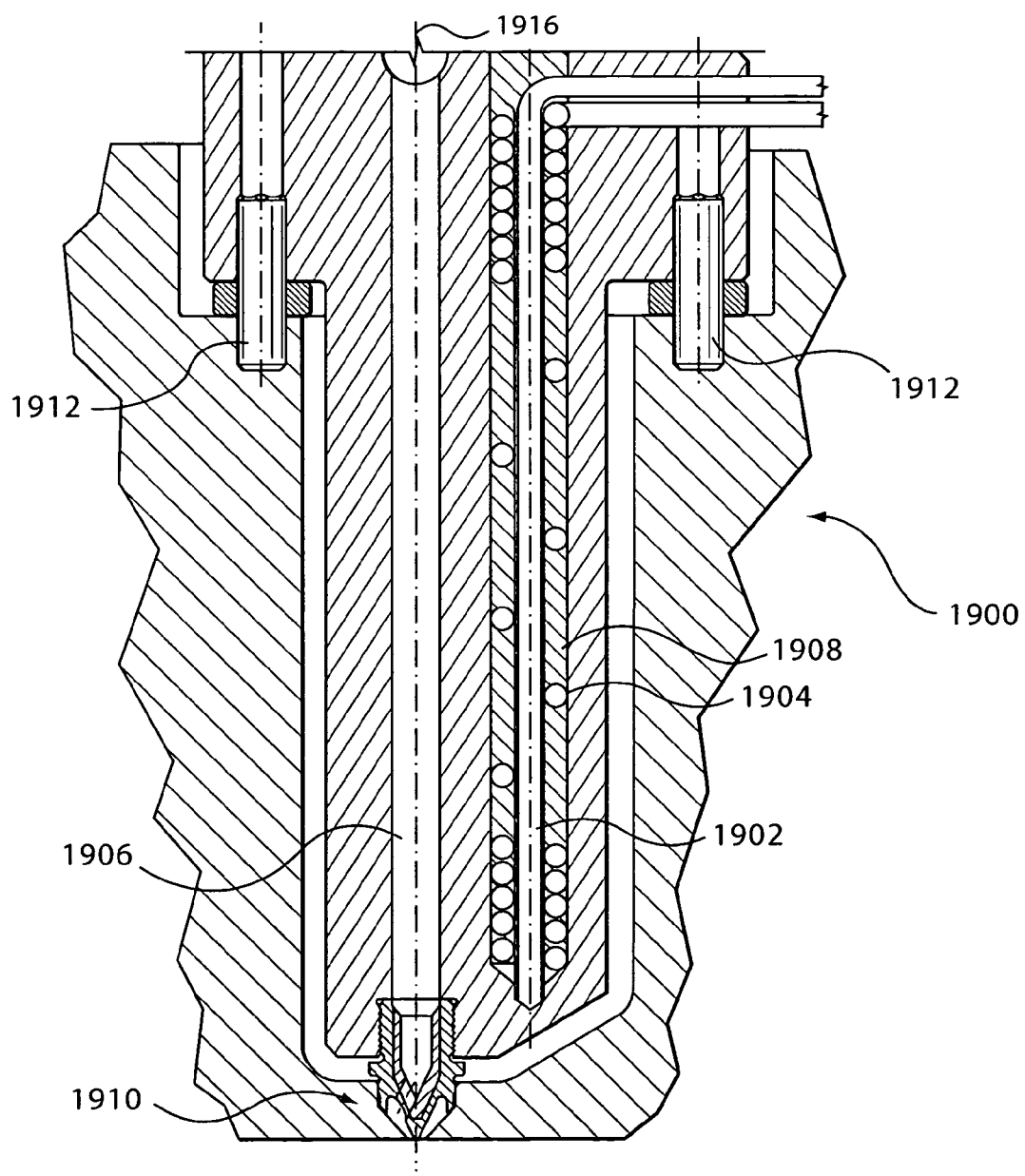

FIGS. 19–20 are a cross-sectional and an end view, respectively, of a micro nozzle 1900 according to an embodiment of the present invention. In this embodiment, micro nozzle 1900 is asymmetrical about a longitudinal axis 1916 of the nozzle melt channel. A thermocouple 1902 is positioned in a heater 1904 (e.g., a helical heater). Both thermocouple 1902 and heater 1904 are located inside a thermally conductive device 1908 (e.g. a coil or tubular heater is positioned around a thermally conductive rod with a hole through it to get all the devices, thermally conductive device, heater, and thermocouple, into one space to reduce space on one side of nozzle channel). Thus, in this embodiment, both sides adjacent central axis 1916 can be reduced, as compared to the micro nozzles in FIGS. 1–18.

Figure 22:
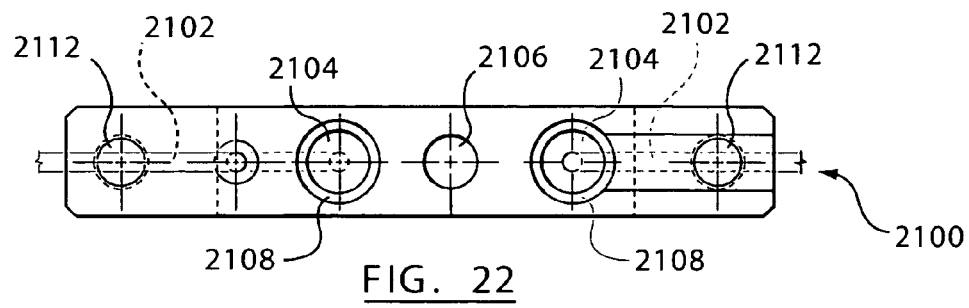
FIGS. 21–22 are a cross-sectional and an end view, respectively, of a micro nozzle according to an embodiment of the present invention.
Figure 21:
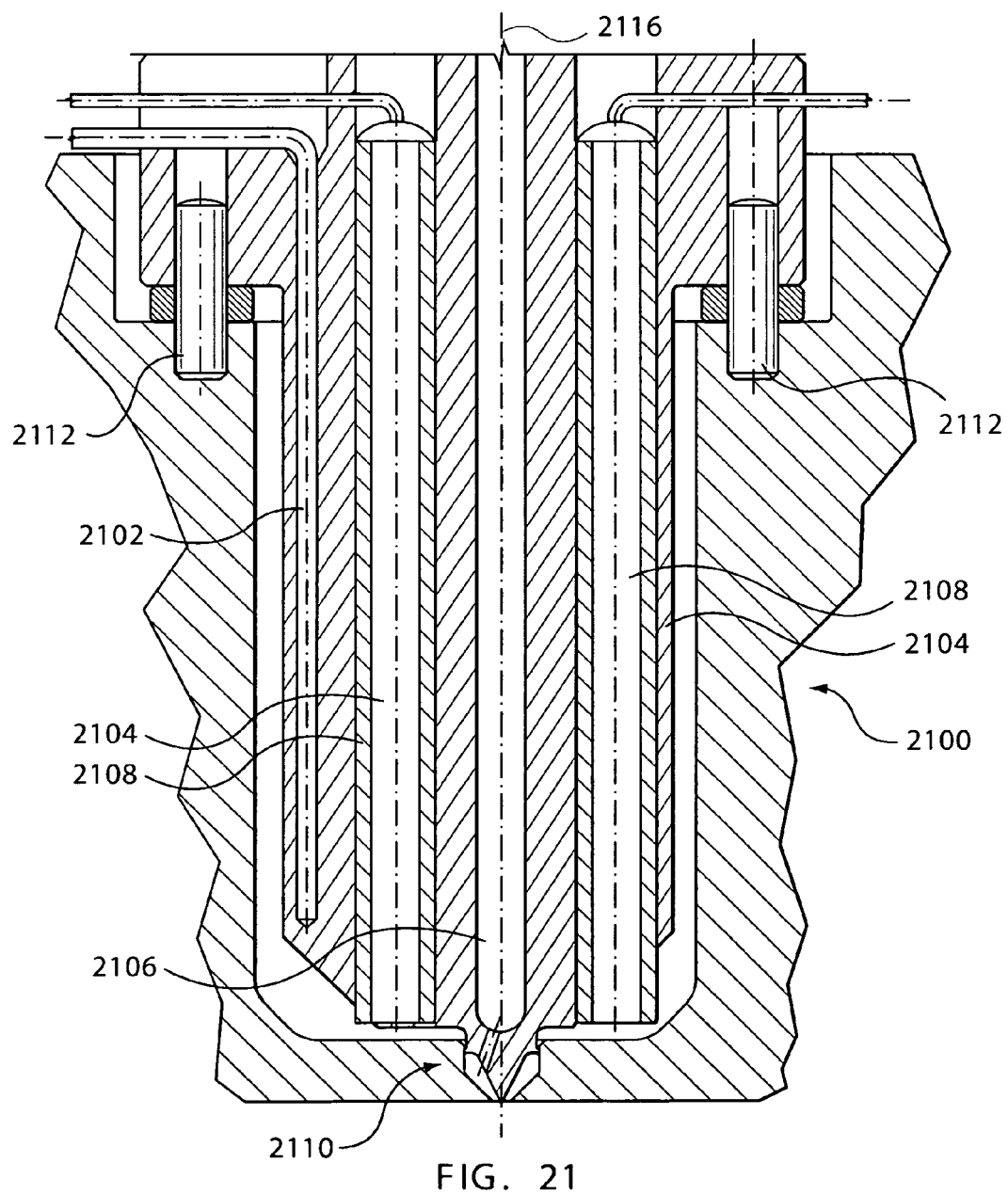

FIGS. 21–22 are a cross-sectional and an end view, respectively, of a micro nozzle 2100 according to an embodiment of the present invention. In this embodiment, micro nozzle 2100 is asymmetrical about a longitudinal axis 2116 of the nozzle melt channel. Micro nozzle 2100 includes two heaters 2104 with proximate thermally conductive devices 2108.

Figure 24:
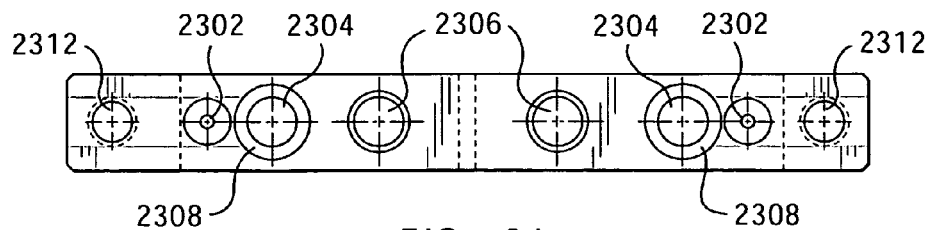
FIGS. 23–24 are a cross-sectional and an end view, respectively, of a micro nozzle according to an embodiment of the present invention.
Figure 23:
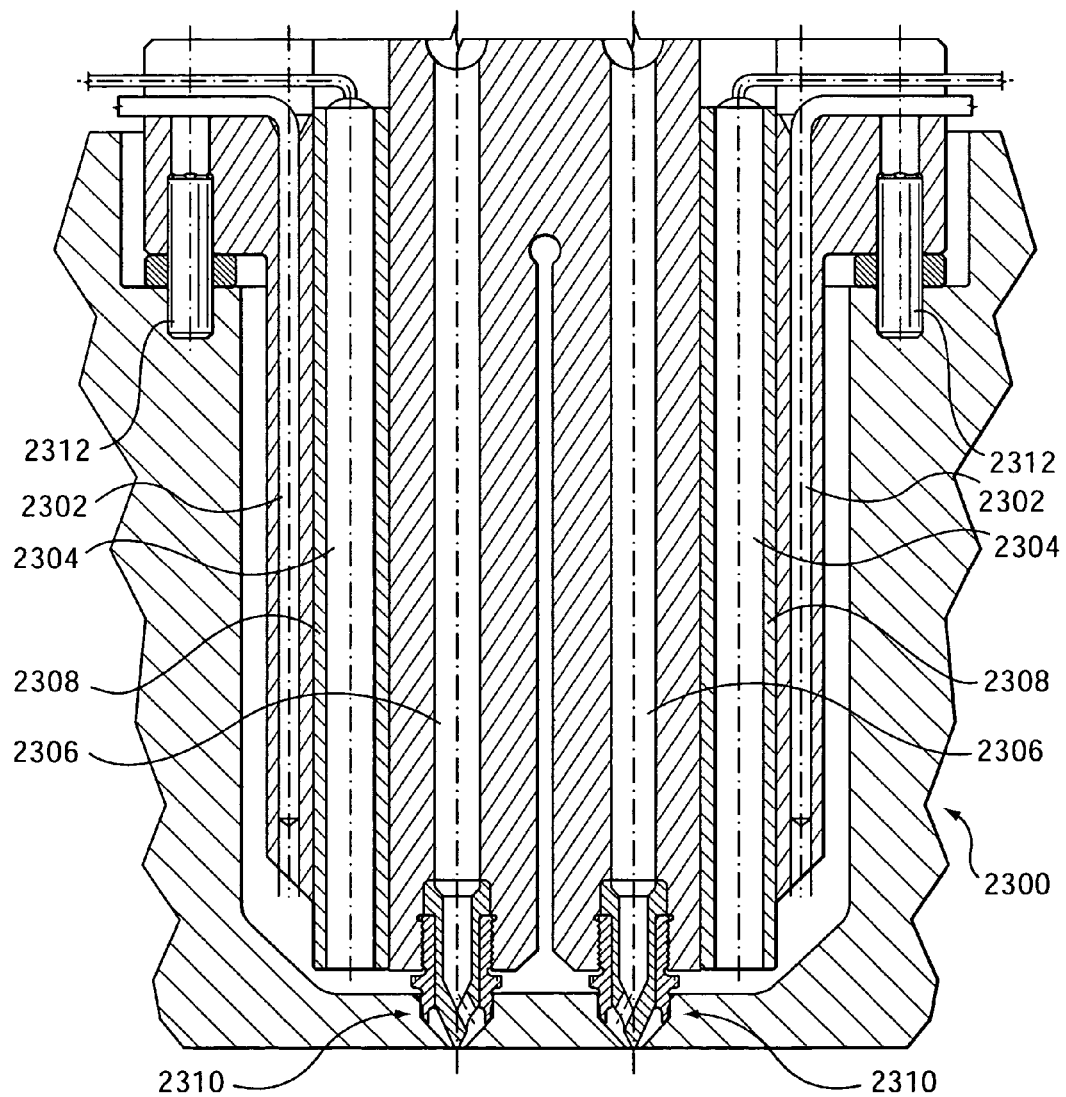

FIGS. 23–24 are a cross-sectional and an end view, respectively, of a micro nozzle 2300 according to an embodiment of the present invention. In this embodiment, a single nozzle body 2300 includes two complete nozzle portions, which each include their own thermocouple 2302, heater 2304, nozzle channel 2306, thermally conductive device 2308, and tip 2310.

Figure 26:
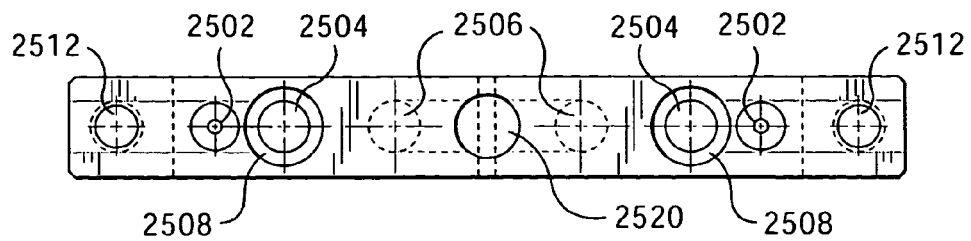
FIGS. 25–26 are a cross-sectional and an end view, respectively, of a micro nozzle according to an embodiment of the present invention.
Figure 25:
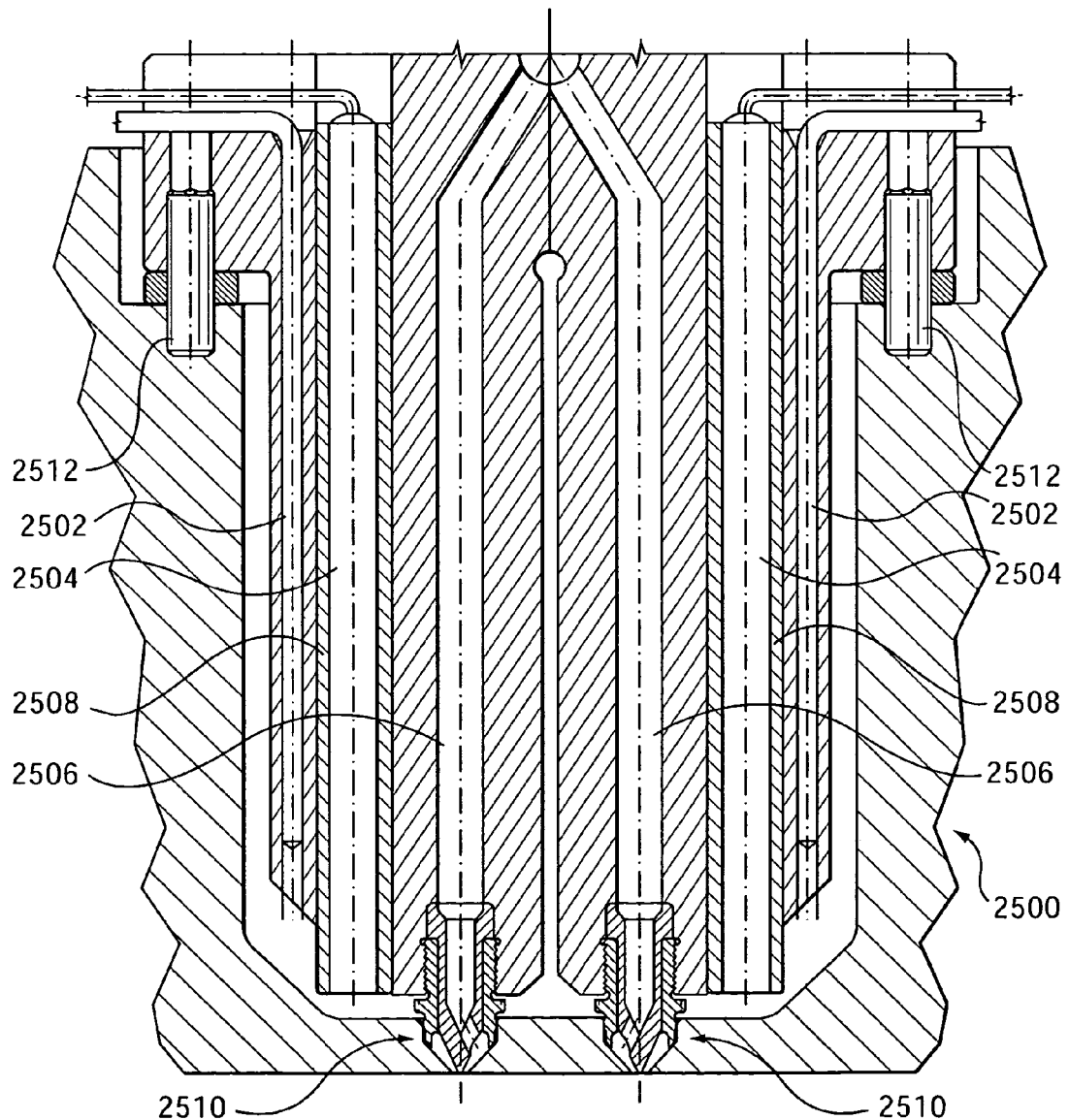

FIGS. 25–26 are a cross-sectional and an end view, respectively, of a micro nozzle 2500 according to an embodiment of the present invention. This embodiment is similar to micro nozzle 2300 in that two complete nozzle portions are shown. A main difference is that an inlet channel 2520 receives melt material from a manifold (not shown) before branching to transmit the melt material to first and second nozzle channels 2506.

Valve Gated Nozzles

Figure 28:
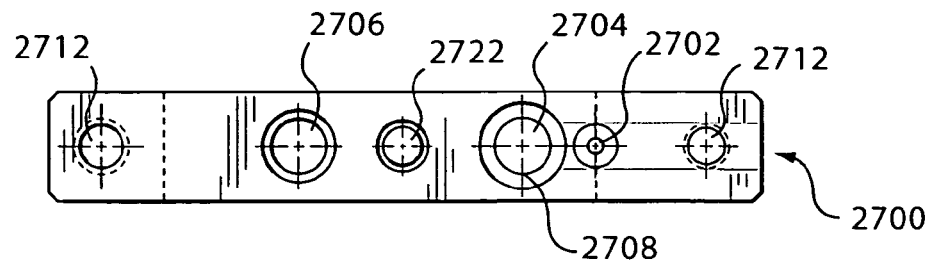
FIGS. 27–28 are a cross-sectional and an end view, respectively, of a micro nozzle according to an embodiment of the present invention.
Figure 27:
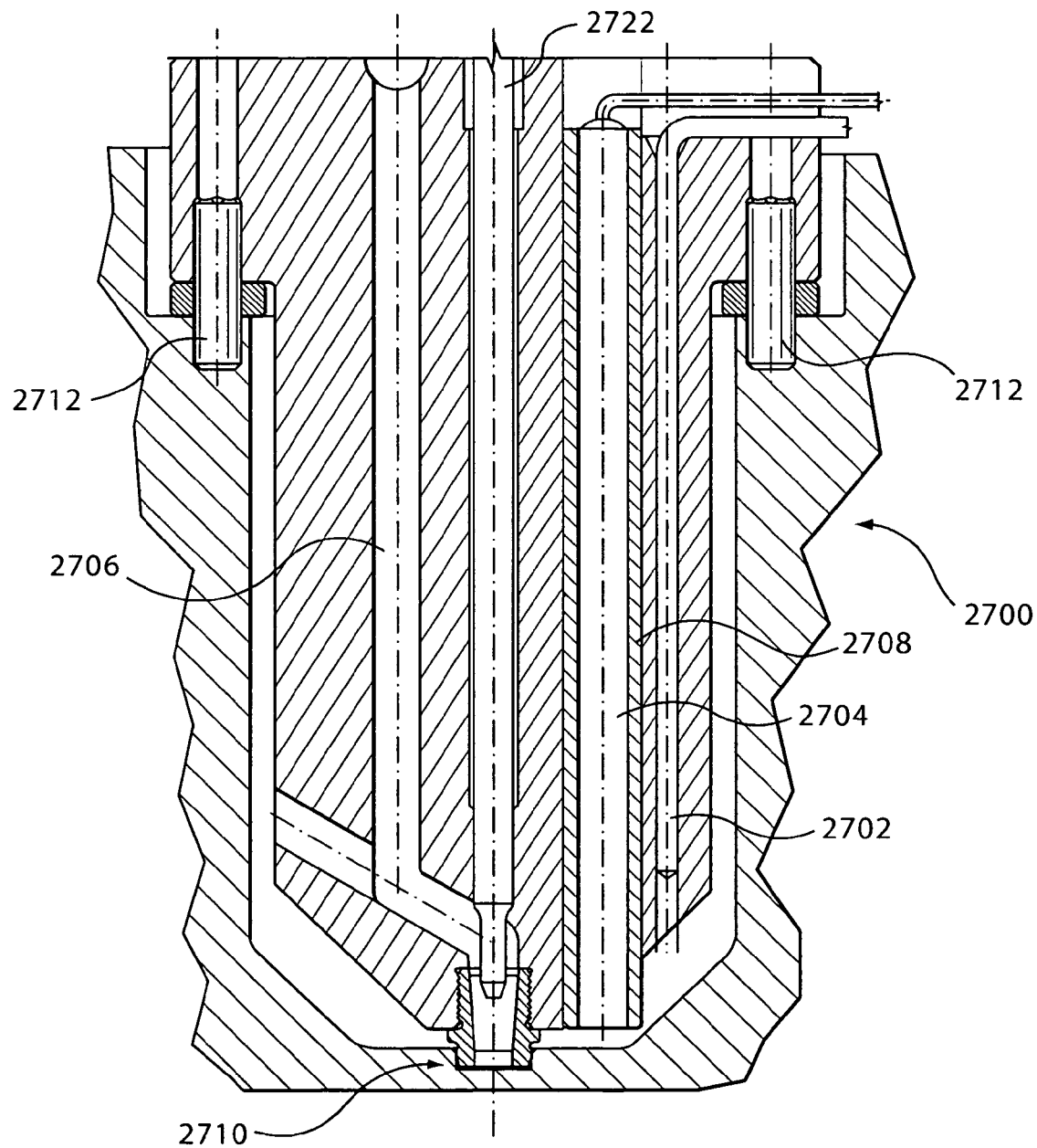

FIGS. 27–28 are a cross-sectional and an end view, respectively, of a micro nozzle 2700 according to an embodiment of the present invention. In this embodiment, a valve pin 2722 interacts to seal off flow of melt material through a tip 2710. Using valve pin 2722 to stop the flow of melt material through tip 2710 is referred to as using valve gating. Although valve pin 2722 is shown as being within its own channel, in other embodiments valve pin 2722 can be within nozzle channel 2706. Micro nozzle channel in micro nozzle is relatively small, for example 4 mm, while a 2.5–3 mm is a typical diameter for valve pin 2722. Thus, if a same channel is used for melt flow and valve pin 2722 a pressure drop that is too high can reduce overall nozzle size. An example of injection molding system using valve gating includes U.S. Pat. No. 4,380,426, which is incorporated herein in its entirety by reference thereto. A nozzle channel 2706 bends before reaching tip area 2710 because a pin channel is placed where nozzle channel 2706 would be in non-valve gate micro nozzles.

Figure 29:
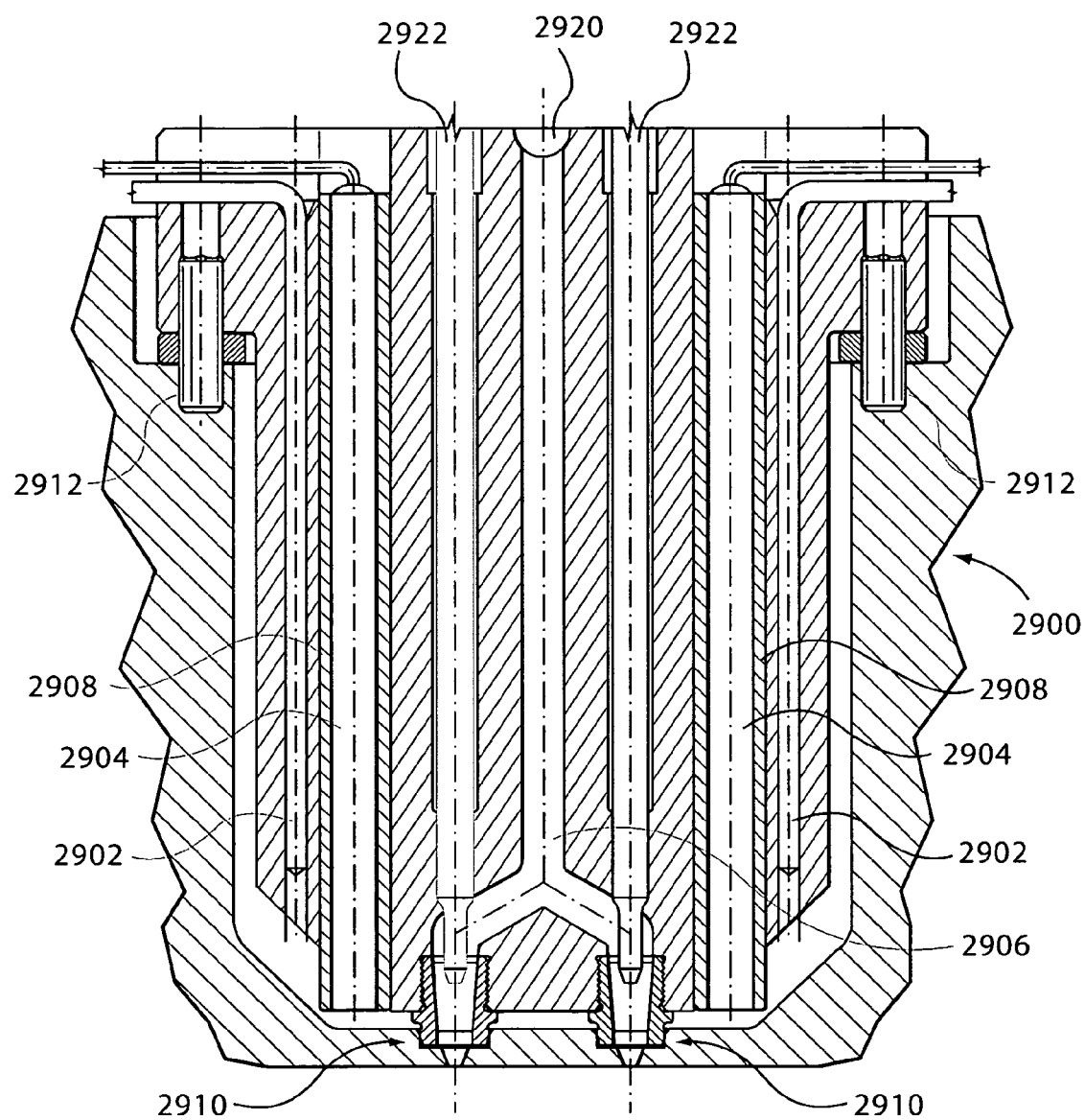
FIG. 29 is a cross-sectional view of a micro nozzle according to an embodiment of the present invention.

FIG. 29 shows a cross-sectional view of a valve-gated micro nozzle 2900 according to an embodiment of the present invention. Two tips 2910 and two flow channels 2906 are utilized to transmit melt material to a mold cavity (not shown).

Edge Gated Nozzles

Figure 31:
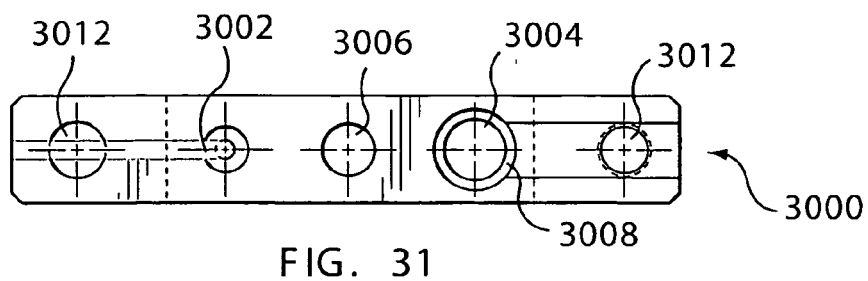
FIGS. 30–31 are a cross-sectional and an end view, respectively, of a micro nozzle according to an embodiment of the present invention.
Figure 30:
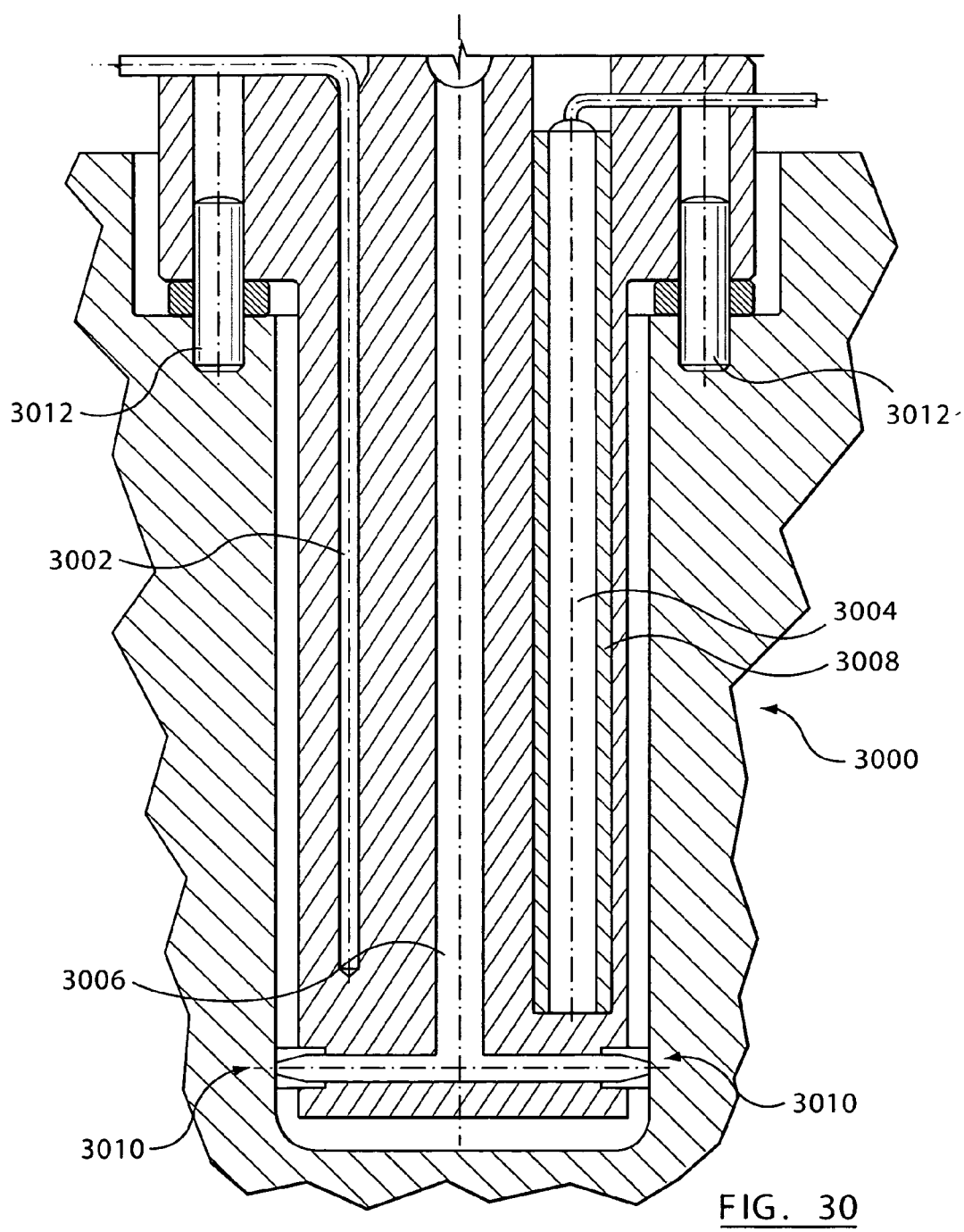

FIGS. 30–31 show a cross-sectional and an end view, respectively, of a micro nozzle 3000 according to an embodiment of the present invention. Micro nozzle 3000 is an edge gated micro nozzle incorporating a thermally conductive device 3008 according to the present invention. All variations and permutations for placement of a thermally conductive device with respect to a thermocouple(s) and/or a heater(s) that would be apparent to a skilled artisan upon reading this description, some of which are discussed above, are contemplated within the scope of injection molding systems using micro nozzle 3000.

Overall System

Figure 32:
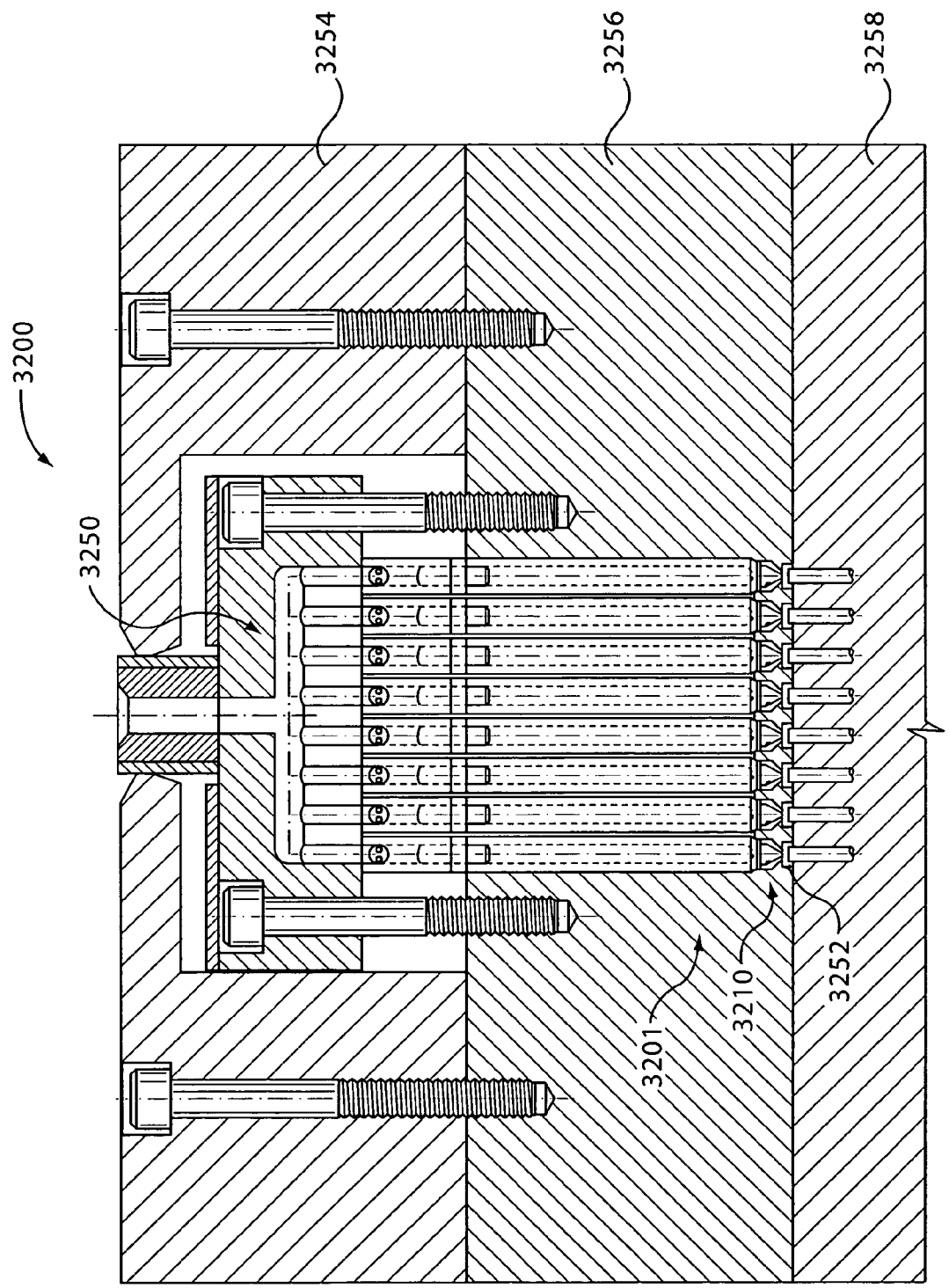
FIG. 32 shows a system according to embodiments of the present invention.

FIG. 32 shows an injection molding system 3200 that includes one or more of any of the micro nozzles discussed above in a micro nozzle array 3201. Melt material input through manifold 3250 passes through one or more micro nozzles in micro nozzle array 3201 and into a mold cavity 3252. System 3200 also includes a manifold plate 3254, a clamp plate (e.g., a hydraulic clamp plate or actuated or pneumatic clamp plate) 3256, and a cavity plate 3258.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A nozzle configured to make injection molded components, comprising:
   a nozzle body;
   a melt channel running through the nozzle body configured to allow melt material flow; p1 a heater positioned within the nozzle body and adjacent one side of the melt channel; and
   a thermally conductive device located inside the nozzle body, the thermally conductive device being configured to produce an even heat profile along an entire length of the melt channel.

2. The nozzle of claim 1, wherein the heater is integral with the thermally conductive device.

3. The nozzle of claim 1, further comprising a thermocouple.

4. The nozzle of claim 3, wherein the thermocouple is integral with the thermally conductive device.

5. The nozzle of claim 3, further comprising:
   a control device configured to receive a signal from the thermocouple, wherein the heater is configured to be controlled via the control device based on the received signal from the thermocouple.

6. The nozzle of claim 3, wherein the thermally conductive device is located proximate one or more of the thermocouple and the heater.

7. The nozzle of claim 1, further comprising a plurality of melt channels.

8. The nozzle of claim 1, further comprising a plurality of heaters.

9. The nozzle of claim 1, further comprising a plurality of thermocouples.

10. The nozzle of claim 1, further comprising a plurality of thermally conductive devices.

11. The nozzle of claim 1, wherein the nozzle is a micro nozzle.

12. The nozzle of claim 1, wherein the nozzle is a flat micro nozzle.

13. The nozzle of claim 1, wherein the nozzle is thermal-gated.

14. The nozzle of claim 1, wherein the nozzle is valve gated.

15. The nozzle of claim 14, wherein a valve pin is inserted into a valve channel spaced from the melt channel.

16. The nozzle of claim 1, wherein the nozzle is edge gated.

17. The nozzle of claim 1, wherein the nozzle body is manufactured from at least one of tool steel, and an alloy comprised of carbon, nickel, cobalt, chromium, molybdenum and iron.

18. The nozzle of claim 1, wherein the thermally conductive device is manufactured from at least one of copper, brass, beryllium, and aluminum.

19. The nozzle of claim 1, wherein the heater is at least one of a film heater, a coil heater, and a cartridge heater.

20. The nozzle of claim 1, wherein the nozzle body is asymmetrical with respect to a longitudinal axis of the nozzle channel.

21. The nozzle of claim 1, further comprising removable nozzle tip.

22. The nozzle of claim 1, further comprising a nozzle seal portion.

23. A nozzle configured to produce injection molded components, comprising:
   a nozzle body;
   a melt channel located inside the nozzle body;
   a heater located inside the nozzle body adjacent only one side of the melt channel, said heater having an uneven heat profile with respect to the melt channel; and
   a thermally conductive device located between the heater and the melt channel that produces an even heat profile along the melt channel.

24. The nozzle of claim 23, wherein the nozzle body comprises an asymmetrical nozzle body.

25. The nozzle of claim 23, wherein the nozzle comprises a flat nozzle.

26. An injection nozzle comprising:
   a nozzle body made from a first material;
   a melt channel located inside the nozzle body;
   a heater located inside the nozzle body and positioned entirely on one side of the melt channel; and
   a thermally conductive device located between the heater and the melt channel, the thermally conductive device being made of a second material which is more thermally conductive than the first material.

27. The nozzle of claim 26, wherein the nozzle body is asymmetrical.

28. The nozzle of claim 26, wherein the thermally conductive device is located along one side of the melt channel.

29. The nozzle of claim 26, wherein the nozzle comprises a flat nozzle.

30. The nozzle of claim 23, further comprising at least one heater located within the nozzle body adjacent a second side of the melt channel.

31. The nozzle of claim 23, wherein the nozzle body is made from a first material and the thermally conductive device is made of a second material that is more thermally conductive than the first material.

32. The nozzle of claim 31, wherein the second material of the thermally conductive device is comprised of at least one of copper, brass, beryllium, and aluminum.

33. The nozzle of claim 26, further comprising at least one heater located within the nozzle body adjacent a second side of the melt channel.

34. The nozzle of claim 26, wherein the second material of the thermally conductive device is comprised of at least one of copper, brass, beryllium, and aluminum.

* * * * *

UNITED STATES PATENT AND TRADEMARK OFFICE
CERTIFICATE OF CORRECTION

PATENT NO. : 7,131,833 B2 Page 1 of 1
APPLICATION NO. : 10/713211
DATED : November 7, 2006
INVENTOR(S) : Denis Babin It is certified that error appears in the above-identified patent and that said Letters Patent is hereby corrected as shown below:

In column 8, line 22, delete "p1" before "a heater".

In column 9, line 9, add -- a -- before "removable".

Signed and Sealed this

Thirteenth Day of February, 2007

JON W. DUDAS
*Director of the United States Patent and Trademark Office*